(12) United States Patent
Ganjam et al.

(10) Patent No.: US 10,311,092 B2
(45) Date of Patent: Jun. 4, 2019

(54) LEVERAGING CORPORAL DATA FOR DATA PARSING AND PREDICTING

(71) Applicant: Microsoft Technology Licensing, LLC, Redmond, WA (US)

(72) Inventors: Kris K. Ganjam, Seattle, WA (US); Kaushik Chakrabarti, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 507 days.

(21) Appl. No.: 15/195,981

(22) Filed: Jun. 28, 2016

(65) Prior Publication Data

US 2017/0371958 A1     Dec. 28, 2017

(51) Int. Cl.
| G06F 16/35 | (2019.01) |
| G06F 17/30 | (2006.01) |
| G06N 7/00 | (2006.01) |
| G06F 17/27 | (2006.01) |

(52) U.S. Cl.
CPC ........ G06F 16/353 (2019.01); G06F 17/2715 (2013.01); G06F 17/30707 (2013.01); G06N 7/005 (2013.01)

(58) Field of Classification Search
CPC .............. G06F 16/353; G06F 17/2715; G06F 17/30707; G06N 7/005
USPC ...................... 707/739, 748, 600; 706/62, 47
See application file for complete search history.

(56) References Cited

U.S. PATENT DOCUMENTS

| 7,194,483 | B1 * | 3/2007 | Mohan ................ G06F 17/3061 |
| | | | 707/600 |
| 7,266,537 | B2 * | 9/2007 | Jacobsen ............. G06F 17/2264 |
| | | | 700/103 |
| 7,328,211 | B2 | 2/2008 | Bordner et al. |
| 7,403,942 | B1 | 7/2008 | Bayliss |
| 7,610,283 | B2 | 10/2009 | Arasu et al. |
| 7,742,970 | B2 | 6/2010 | Thierer et al. |
| 8,050,906 | B1 | 11/2011 | Zimmerman et al. |
| 8,346,791 | B1 | 1/2013 | Shukla et al. |
| 8,494,285 | B2 * | 7/2013 | Zhang ..................... G06T 7/162 |
| | | | 382/195 |
| 8,606,771 | B2 | 12/2013 | Arasu et al. |
| 9,317,544 | B2 | 4/2016 | Ganjam et al. |
| 9,367,814 | B1 | 6/2016 | Lewis et al. |
| 9,805,072 | B2 | 10/2017 | Spiess et al. |
| 9,912,731 | B2 | 3/2018 | Kaushik et al. |
| 2004/0260694 | A1 | 12/2004 | Chaudhuri et al. |

(Continued)

OTHER PUBLICATIONS

"Non Final Office Action Issued in U.S. Appl. No. 15/195,923", dated Mar. 28, 2018, 15 Pages.

(Continued)

*Primary Examiner* — Dung K Chau

(74) *Attorney, Agent, or Firm* — Drinker Biddle & Reath LLP

(57) ABSTRACT

The techniques discussed herein leverage structure within data of a corpus to parse unstructured data to obtain structured data and/or to predict latent data that is related to the unstructured and/or structured data. In some examples, parsing and/or predicting can be conducted at varying levels of granularity. In some examples, parsing and/or predicting can be iteratively conducted to improve accuracy and/or to expose more hidden data.

20 Claims, 15 Drawing Sheets

(56) References Cited

U.S. PATENT DOCUMENTS

| | | | | |
|---|---|---|---|---|
| 2005/0108001 | A1* | 5/2005 | Aarskog | G06F 17/271 704/10 |
| 2006/0053133 | A1 | 3/2006 | Parkinson | |
| 2007/0106686 | A1 | 5/2007 | Shank et al. | |
| 2008/0183693 | A1 | 7/2008 | Arasu et al. | |
| 2009/0019032 | A1 | 1/2009 | Bundschus et al. | |
| 2009/0037403 | A1 | 2/2009 | Joy et al. | |
| 2009/0150370 | A1 | 6/2009 | Christensen et al. | |
| 2009/0210418 | A1 | 8/2009 | Arasu et al. | |
| 2009/0285474 | A1 | 11/2009 | Berteau et al. | |
| 2010/0070448 | A1* | 3/2010 | Omoigui | H01L 27/1463 706/47 |
| 2011/0276577 | A1 | 11/2011 | Yao et al. | |
| 2012/0221485 | A1* | 8/2012 | Leidner | G06Q 10/0635 705/36 R |
| 2012/0278336 | A1* | 11/2012 | Malik | G06F 17/2775 707/748 |
| 2013/0091120 | A1 | 4/2013 | Ganjam et al. | |
| 2014/0052688 | A1 | 2/2014 | Bansal | |
| 2016/0042359 | A1* | 2/2016 | Singh | G06Q 30/016 704/2 |
| 2016/0110446 | A1 | 4/2016 | Lightner et al. | |
| 2017/0374093 | A1 | 12/2017 | Dhar et al. | |

OTHER PUBLICATIONS

"International Search Report and Written Opinion Issued in PCT Application No. PCT/US2017/038631", dated Aug. 2, 2017, 13 Pages.

Ananthakrishna et al., "Eliminating Fuzzy Duplicates in Data Warehouses," In Proceedings of the 28th international conference on Very Large Data Bases, Aug. 20, 2002, 12 pages.

Arasu et al., "Efficient Exact Set-Similarity Joins," In Proceedings of the 32nd international conference on Very large data bases, Sep. 12, 2006, pp. 918-929.

Arasu et al., "Experiences with using Data Cleaning Technology for Bing Services," In Proceedings of IEEE Computer Society Technical Committee on Data Engineering, vol. 35, No. 2, Jun. 2012, pp. 1-10.

Arasu et al., "Towards a Domain Independent Platform for Data Cleaning," In Proceedings of Bulletin of the IEEE Computer Society Technical Committee on Data Engineering, vol. 34, No. 3, Sep. 2011, pp. 1-8.

Arasu et al., "Transformation-based Framework for Record Matching," In Proceedings of the IEEE 24th International Conference on Data Engineering, Apr. 7, 2008, 10 pages.

Bjones, "Identity as a Service Microsoft," Retrieved on: Feb. 15, 2016, Available at: <<http://www.gsebelux.com/system/files/2012_09_07%20Identity%20as%20a%20Service.pdf>> 31 pages.

Chaudhuri et al., "Robust and efficient fuzzy match for online data cleaning," In Proceedings of Proceedings of the ACM SIGMOD international conference on Management of data, Jun. 9, 2003, 12 pages.

"Consolidated Screening List API," Published on: Aug. 12, 2015, Available at: <<http://developer.trade.gov/consolidated-screening-list.html>> 17 pages.

"Denied Trade Screening," Retrieved on: Feb. 11, 2016, Available at: <<https://en.wikipedia.org/wiki/Denied_trade_screening>> 2 pages.

"Descartes MK Denial," Retrieved on: Feb. 11, 2016, Available at: <<https://www.mkdenial.com/>> 2 pages.

Eber et al., "Challenges and trends in identity matching," Retrieved on: Feb. 15, 2016, Available at: <<http://www2.deloitte.com/content/dam/Deloitte/lu/Documents/risk/lu-challenges-trends-identity-matching-30102014.pdf>> 4 pages.

El-Shishtawy, "Linking Databases using Matched Arabic Names," In Journal of Computational Linguistics and Chinese Language Processing, vol. 19, Issue 1, Mar. 2014, pp. 33-54.

"Federal Cloud Credential Exchange (FCCX)," Retrieved on: Feb. 11, 2016, Available at: <<http://about.usps.com/news/secure-digital/welcome.htm>> 1 page.

"Federated Identity with Microsoft Azure Access Control Service," Retrieved on: Feb. 15, 2016, Available at: <<https://msdn.microsoft.com/en-us/library/hh446535.aspx>> 17 pages.

"Global Trade Management and the Cloud—Does It Work?" Published on: Feb. 2014, Available at: <<http://www.bpdelivery.com/wp-content/uploads/2014/02/The-Supply-Chain-Cloud.pdf>> 26 pages.

Htun et al., "Cross-language Phonetic Similarity Measure on Terms Appeared in Asian Languages," In International Journal of Intelligent Information Processing, vol. 2, No. 2, Jun. 2011, pp. 9-21.

"Infosys oracle GTM cloud solution," Retrieved on: Feb. 25, 2016, Available at: <<https://www.infosys.com/Oracle/offerings/Documents/global-trade-management.pdf>> ___ pages.

"Intredex Export Compliance—Denied & Restricted Party Screening," In White Pager of Intredex, Jul. 2014, 3 pages.

Irmen, "10 Ways to Reduce the Cost, Risk of Global Trade," In the Journal of Commerce, Apr. 8, 2009, 2 pages.

"Latest Release of SAP Global Trade Services Introduces New Foreign Trade Zone and Screening Capabilities," Published on: Jun. 18, 2015, Available at: <<http://news.sap.com/latest-release-of-sap-global-trade-services-introduces-new-foreign-trade-zone-and-screening->> 6 pages.

Loro et al., "Indexing and Selecting Hierarchical Business Logic," In Proceedings of Very Large Data Bases Endowment, vol. 8, No. 12, Aug. 31, 2015, pp. 1656-1667.

"OFAC Name Matching and False-Positive Reduction Techniques," Published on: Jul. 2014, Available at: <<http://www.cognizant.com/InsightsWhitepapers/OFAC-Name-Matching-and-False-Positive-Reduction-Techniques-codex1016.pdf>> 13 pages.

"Oracle Transportation and Global Trade Management Cloud," Published on: Aug. 2014, Available at: <<http://www.oracle.com/us/products/applications/transportation-global-trade-2291963.pdf>> 2 pages.

"Periodic Business Partner Check in Positive/Negative List," Published on: Jul. 10, 2015, Available at: <<https://help.sap.com/saphelp_gts10/helpdata/en/4c/51a5a671474d4ae10000000a15822b/content.htm>> 3 pages.

"Precision and recall," Retrieved on: Feb. 15, 2016, Available at: <<https://en.wikipedia.org/wiki/Precision_and_recall>> 4 pages.

Treeratpituk et al., "Name-Ethnicity Classification and Ethnicity-Sensitive Name Matching," In Proceedings of the Twenty-Sixth AAAI Conference on Artificial Intelligence, Jul. 22, 2012, pp. 1141-1147.

Udupa et al., "Hashing-based Approaches to Spelling Correction of Personal Names," In Proceedings of the Conference on Empirical Methods in Natural Language Processing, Oct. 9, 2010, pp. 1256-1265.

Winkler, "Matching and Record Linkage," In Journal of Business survey methods, vol. 1, Mar. 1995, pp. 1-38.

Zheng, "The MITRE Name Matching Challenge," Retrieved on: Feb. 15, 2016, Available at: <<http://www.mathcs.emory.edu/~lxiong/cs570_s11/share/project/Shuai_MITRE.pdf>> 11 pages.

* cited by examiner

LEVERAGING CORPORAL DATA FOR DATA PARSING AND PREDICTING

BACKGROUND

As information available to computing devices has exponentially increased, the amount of this information that is unstructured has correspondingly increased. Unstructured data can be described as "raw data," "minimally-processed raw data," or, more generally, as data that lacks relational structure such as a relationship between the data and identifiers of what the data is and/or what the data is like. Unstructured data presents problems for both humans and computing devices alike, but often in different manners. Computing devices, unlike humans in most cases, cannot automatically discern what a particular piece of data is or is like. Without something more, computing devices may mistreat unstructured data and/or fail to perform an operation with the unstructured data that the computing device is configured to use. For example, a computer could be configured to auto-populate fields of a document with information such as names, addresses, brand models, etc. when the computing device has access to such information. However, if the computing device is not aware that data to which it has access corresponds to one of those data types, the computing device would not be able to populate the fields.

On the other hand, human users may not be familiar with a particular type of data and therefore may not be able to characterize it. For example, a United States citizen may easily recognize a string having a pattern (###) ###-#### as a phone number, but that same person may not be able to identify or distinguish foreign phone numbers from addresses or licensing numbers. Furthermore, humans may mentally mischaracterize data based on personal experience that does not broadly account for factors outside an individual's experience. For example, a non-technically trained person could mischaracterize an IP address as a foreign phone number.

Furthermore, both humans and computing devices often suffer from a lack of latent (e.g., hidden, not immediately obvious, inferential) attributes of data. Although human minds, unlike computers, can infer data (e.g., guessing a gender or nationality of a name, guessing a year of a car model based on prior knowledge about the range of years), at the time a user is impressed with data the user may not be able to infer latent data without prior knowledge and/or without finding more information regarding the data (e.g., a degree held by an individual associated with a name and address of the data, an IP address associated with a location or individual).

SUMMARY

This summary is provided to introduce simplified concepts relating to leveraging corporal data for data parsing and predicting. This summary is not intended to identify essential features of the claimed subject matter, nor is it intended for use in determining the scope of the claimed subject matter.

In some examples, the techniques described herein can utilize information available in a corpus (i.e., corporal data) to parse unstructured data. The techniques discussed herein can make unstructured data cognizable by computing devices and/or humans based at least in part on leveraging corporal data to parse unstructured data to obtain structured data. In some examples, the techniques discussed herein can also enrich unstructured and/or structured data by exposing data latently related to the unstructured data by leveraging corporal data to parse and/or predict the latent data. For example, although a human user can perceive that unstructured data might signify a name, an address, and a phone number, a human or a computing device cannot know, without previous knowledge or subsequent research, latent data such as a company name also associated with the address or an email or income of an individual associated with the unstructured data that doesn't appear in the unstructured data.

In some examples, parsing data includes identifying what the unstructured data is (e.g., a class of the unstructured data). In some examples, the techniques described herein can utilize information from a corpus to predict data related to the unstructured data. In some examples, parsing and/or predicting data can include identifying what the data is like (e.g., attributes of the unstructured data) and/or what relationships may exist between the unstructured data, other data, classes of the unstructured data or other data, and/or attributes of the unstructured data or other data. In some examples, predicting data can include exposing latent data (e.g., data that is not part of the unstructured data, data that is related to the unstructured data by inference, data that is not immediately recognizable as being a characteristic of the unstructured data but may nonetheless be associated with the unstructured data, etc.). In some examples, the techniques described herein can parse unstructured data to obtain structured data and predict data related to the structured data. In some examples, the techniques described herein can include adding the predicted data to the structured data.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
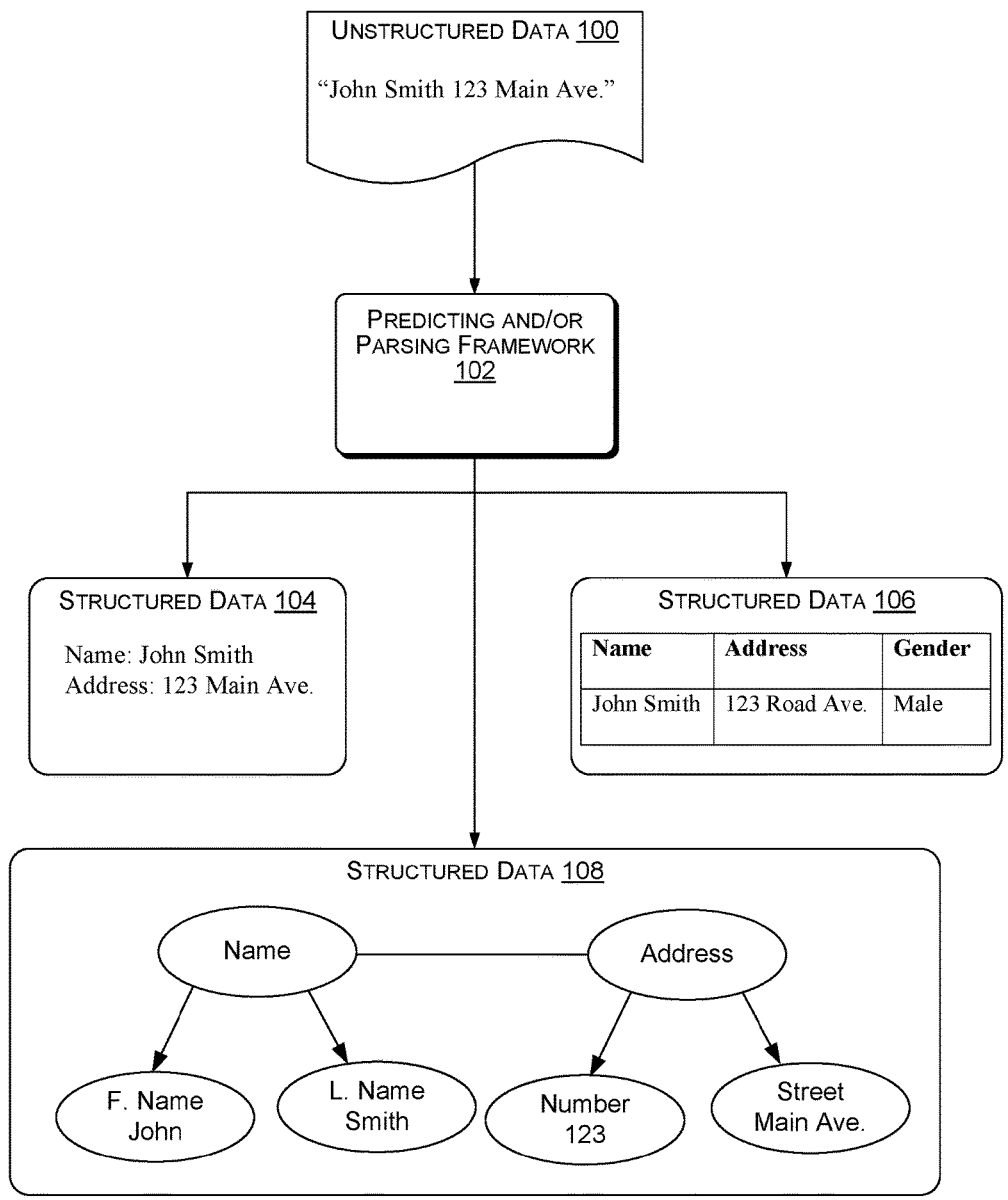
FIG. 1 is a block diagram depicting example unstructured data, an example parsing and/or predicting framework to produce example representations of structured data.

This disclosure is directed to techniques to parse and predict data for unstructured data by leveraging corporal data. The techniques described herein can utilize information available in a corpus to parse unstructured data and/or predict data related to the unstructured data. In some examples, the techniques discussed herein can make unstructured data cognizable by and/or useful for computing devices and/or humans based at least in part on parsing and/or predicting using corporal data. For example, a computing device may be able to perform multiple operations on obtained unstructured data if the unstructured data is transformed into structured data that provides adequate information for the computing device to know how to treat the unstructured data. For humans, strings can include sequences of symbols that are unfamiliar to particular populations (e.g., foreign phone numbers or addresses, MAC addresses to non-technically trained individuals, the gender associated with a name) and the techniques discussed herein can form structured data that characterizes the unstructured data so that the unstructured data is cognizable to a human user.

In some examples, the techniques discussed herein can enrich unstructured data by exposing data latently related to the unstructured data by leveraging corporal data to parse and/or predict as discussed herein. In some examples, corporal data includes a collection of data that includes one or more of text, table(s), form(s), video data and/or metadata, audio data and/or metadata, hierarchies, graphs, other relational data, etc. For example, corporal data can include portions of one or more of web pages, a web table, a directed graph, a neural network, a form (whether the form is filled out or not), a schema, a database, etc. In some examples, the techniques discussed herein can leverage the structure of the corporal data. In some examples, the "structure" of the corporal data is the manner in which data of the corporal data is related and/or organized (e.g., two points of data that appear in a same file can be said to be related on one level, a field value can be related to a header when the field value occupies a field that is associated with the header).

In some examples, the techniques described herein can utilize information available in a corpus to parse unstructured data. The techniques discussed herein can make unstructured data cognizable by computing devices and/or humans based at least in part on parsing. In some examples, the techniques discussed herein can enrich unstructured data by exposing data latently related to the unstructured data by parsing and/or predicting leveraging corporal data. In some examples, the techniques discussed herein can parse data and/or predict related data with limited or no training, which greatly reduces the complexity of development and deployment of the techniques. In some examples, the techniques discussed herein can enable a computing device to accurately parse data and/or or predict related data even when the unstructured data provided to the computing device does not appear in the corporal data.

In some examples, the techniques described herein can use any portion of the unstructured data and/or structured data to make a prediction. This is an improvement over previous techniques that require a previously defined schema in order to predict a particular attribute. For example, to predict the attribute, "Gender," previous techniques would require a set schema such as a first name, a last name, and an age. These previous methods could not leverage any data that might be additionally obtained (e.g., if a location was also provided with a first name, last name, and age) and could not accurately function if less than all of the data of the schema is provided (e.g., if the first name was missing). In some examples, techniques discussed herein can predict an attribute identifier and/or attribute value using any portion of the unstructured data, parsed data, and/or predicted data. For example, the techniques discussed herein could predict a gender if a last name and age was obtained or the techniques discussed herein could predict a gender if a first name, last name, age, and location were obtained.

In some examples, parsing data includes identifying what the unstructured data is (e.g., a class of the unstructured data). In some examples, parsing unstructured data includes calculating from a corpus one or more of a frequency with which a class is associated with the unstructured data within the corpus; a co-occurrence of classes and/or class values in the corpus when the unstructured data is present; a probability that a class identifier is associated with the unstructured data; a support metric for an estimate of a likely class for the unstructured data (e.g., a measure of how much support exists to derive the likelihood); or a confidence metric.

In some examples, parsing unstructured data includes associating a class identifier of a plurality of identified class identifiers with the unstructured data based at least in part on an arrangement of the unstructured data, an arrangement of corporal data and/or frequency of an arrangement of corporal data, other unstructured data, and/or parsing of the other unstructured data. In some examples, associating a class identifier with unstructured data makes the unstructured data with which the class identifier has been associated structured data. In some examples, this association can include assigning the class identifier to the unstructured data in some manner (e.g., creating a table, inserting the unstructured data, and titling row(s) and/or column(s) of the unstructured data with one or more class identifiers; creating a bag for the class identifier that includes the unstructured data; labeling the unstructured data with a class identifier; adding metadata to the unstructured data that includes the class identifier), otherwise creating a relationship between the class identifier and the unstructured data (e.g., creating an edge in a graph between the class identifier and the unstructured data, including the unstructured data as a child of the class identifier in a hierarchy or tree, adding the class identifier to a bag including the unstructured data), or using the class identifier to create relationships between the unstructured data itself or other data and the unstructured data (e.g., associating data that is a species of the class to which the class identifier corresponds).

In some examples, the techniques described herein can utilize information from a corpus to predict data related to the unstructured data and/or structured data. In some examples, predicting data includes identifying what the data is like (e.g., attribute identifiers associated with the unstructured data) and/or what relationships may exist between the unstructured data, other data, classes of the unstructured data or other data, and/or attributes of the unstructured data or other data. In some examples, predicting data can include exposing latent data (e.g., data that is not part of the unstructured data, data that is related to the unstructured data by inference, data that is not immediately recognizable as being a characteristic of the unstructured data but may nonetheless be associated with the unstructured data). In some examples, the techniques described herein can parse unstructured data to obtain structured data and predict data related to the structured data. In some examples, the techniques described herein can include adding the predicted data to unstructured or structured data.

In some examples, the techniques described herein can use corporal data to predict and/or parsed by calculating a probabilistic database from the corporal database. In some examples, to parse unstructured data, the techniques described herein can include calculating a probabilistic database that includes classes that are associated with the unstructured data in the corporal data and probabilities that the classes are associated with the unstructured data based at least in part on a frequency with which the classes are associated with the unstructured data in the corporal data. In some examples, the probabilistic database for parsing can be calculated to obtain a classification or to obtain a classification value. In some examples, the probabilistic database can further include on one or more of a support metric for the probability, and/or a frequency of appearance in the corporal data of arrangement of tokens that includes at least one token of the unstructured data. As used herein, the elements of a probabilistic database identified by the techniques from the corporal data can be referred to broadly as "candidate classifications," which refers to class identifiers, class values, attribute identifiers, and/or attribute values that compose a probabilistic database.

In some examples, to predict data, the techniques described herein can include calculating a probabilistic database that includes attribute labels and/or attribute values that are associated with the unstructured data and/or the parsed data in the corporal data based at least in part on a frequency with which the attribute labels and/or attribute values are associated with the unstructured data and/or the parsed data in the corporal data. In some examples, the techniques described herein can include obtaining a target attribute value and/or uncovering latent attribute labels and/or attribute values. In some examples, the probabilistic database can further include on one or more of a support metric for the probability, and/or a frequency of appearance in the corporal data of arrangement of tokens that includes at least one token of the unstructured data.

In some examples, the techniques discussed herein can improve a computing device's ability to match data (e.g., fuzzy matching). In some examples, the techniques discussed herein can improve the security of computing devices or of any instance where a discrepancy between provided data and ground truth data reveals a potential problem. For example, if "true" structured data (e.g., attributes, identifiers, relationships that are considered true) differs from data obtained by parsing and/or prediction of data from data-in-question, whether structured or not, that discrepancy can be used as an alert or to take preventative measures regarding a source of the data-in-question.

As used herein, "unstructured data" can be described as "raw data," "minimally-processed raw data," or, more generally, as data that lacks relational structure such as relationships between the data of the unstructured data and/or identifiers of what the data of the unstructured data is (i.e., a class of the data) and/or what the data is like (i.e., attributes of the data). As used herein, "structure" refers to the organizational relationship between data. As used herein, "corporal data" refers to data of a corpus, such as, for example, a collection of text, images, video, audio, or some combination thereof. In some examples, corporal data can include textual representations, conversions, and/or textually-processed forms of video, audio, and/or images. In some examples, corporal data can include unstructured and/or structured data.

The term "techniques" can refer to system(s), method(s), computer-readable media encoded with instructions, module(s), and/or algorithms, as well as hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), etc. as permitted by the context described above and throughout the document.

Example Data

FIG. 1 includes an example of unstructured data 100, "John Smith 123 Road," input to a predicting and/or parsing framework 102 that produces one or more examples of structured data (104-108). Example structured data 104 has structure that includes carriage return delimitation and includes class identifiers, "Name" and "Address." As used herein, "Name" is a classification of "John Smith" and "Address" is a classification of "123 Main Ave." As related to "John Smith," however, "123 Main Ave" can be described as an "attribute value" and "Address" can be described as an "attribute identifier" or "attribute label." More generally, attribute identifiers and attribute values, in relation to a particular token such as, "John Smith" can be characterized as "related data" due to both its conceptual relatedness that arises through a real-world relationship between "John Smith" and "123 Main Ave" (e.g., a person represented by the token "John Smith" could live or work at "123 Main Ave"), which the techniques discussed herein seek to leverage via corporal data. In other words, as used herein a class identifier that is related to a token-of-interest is referred to as an "attribute label" and the data associated with the "attribute label" is referred to as an "attribute value" (note that the attribute value is also related to the class identifier and the token-of-interest). In some examples, unstructured data, structured data, class identifiers, attribute labels, and attribute values can include a token.

For example, to illustrate the terminology, "Name" is a class identifier or classification of "John Smith" or, more broadly, a class identifier associated with the unstructured data 100 and "Address" is a class identifier or classification of "John Smith" or, more broadly, a class identifier associated with the example unstructured data 100. "Address" is an "attribute label" related to "John Smith", "Name", and the example unstructured data 100 and "123 Main Ave." is an "attribute value" related to "John Smith", "Name", and the example unstructured data 100.

Example structured data 106 has structure that includes rows and columns that signify relationships between tokens of the unstructured data and class identifiers of those tokens. Example structured data 108 generally portrays creating relationships between class identifiers (both general class identifies "Name" and "Address" and specific class identifiers "F. Name," "L. Name," "Number," and "Street"). Example structured data 108 is also an example of data that results from iteratively conducting parsing at different levels of granularity (e.g., once at a first level of granularity to obtain the class identifiers "Name" and "Address" and another time at a second level of granularity to obtain the class identifiers "F. Name", "L. Name", "Number", and "Street", respectively). In some examples, structural data can include directionality or dependence, as example structured data 108 illustrates with arrows.

Example Environment

Figure 2:
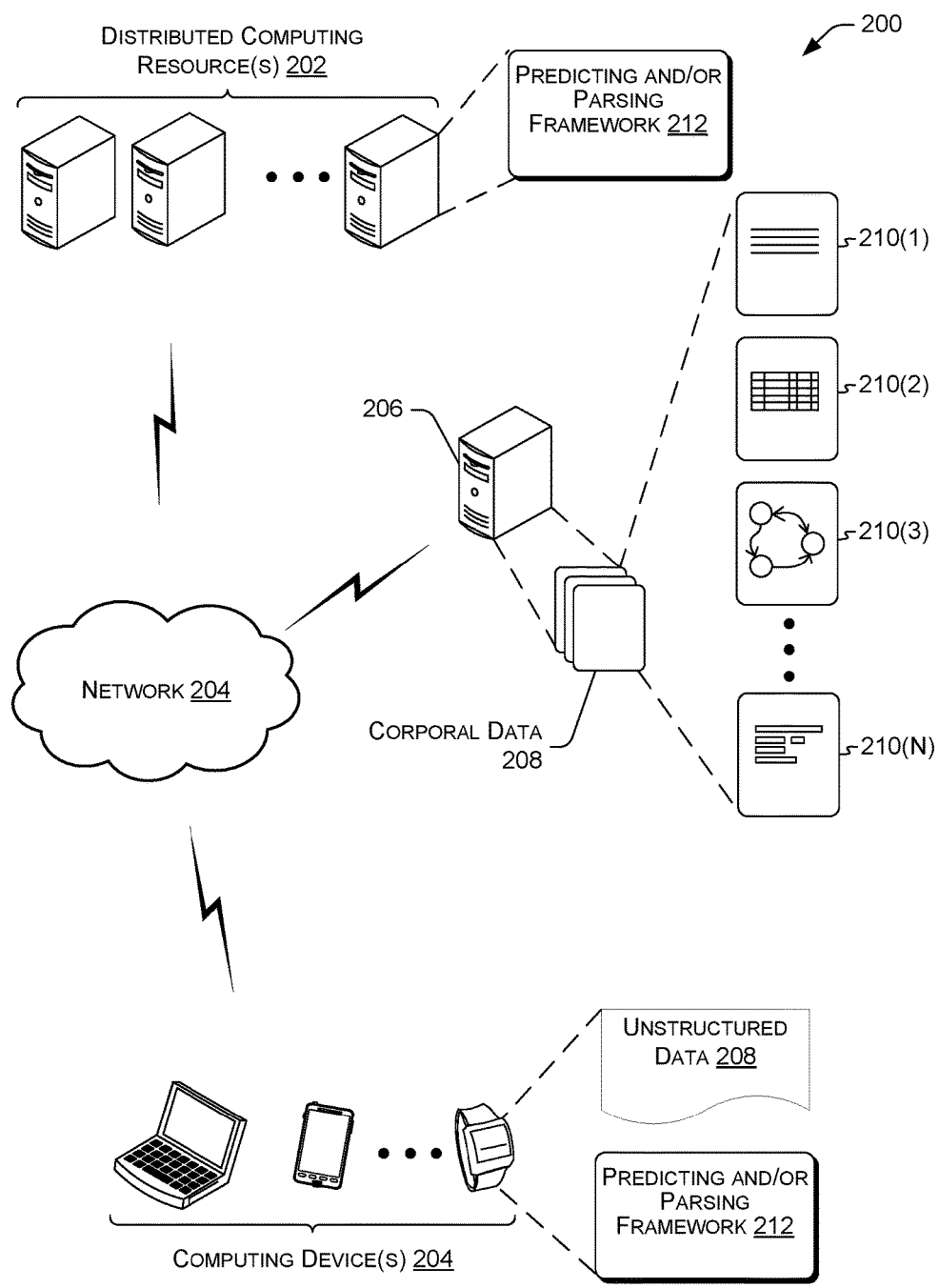
FIG. 2 is a block diagram of an example environment in which the techniques discussed herein to parse and/or predict by leveraging corporal data may operate.

FIG. 2 is a block diagram depicting an example environment 200 in which example techniques described herein can operate. In some examples, the various devices and/or components of environment 200 include distributed computing resources 202 that can communicate with one another and with external devices via one or more networks 204. In some examples, network(s) 204 can include public networks such as the Internet, private networks such as an institutional and/or personal intranet, or some combination of private and public networks. Network(s) 204 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 204 can utilize communication protocols, including packet-based and/or datagram-based protocols such as internet protocol (IP), transmission control protocol (TCP), user datagram protocol (UDP), and/or other types of protocols.

In some examples, the distributed computing resources 202 can implement the techniques described herein. For example, the distributed computing resource(s) 202 can be a service that performs portions of parsing data and/or predicting data by leveraging corporal data. Examples support scenarios where distributed computing resource(s) 202 can include one or more computing devices that operate in a cluster and/or other grouped configuration to share resources, balance load, increase performance, provide fail-over support and/or redundancy, and/or for other purposes. Although illustrated as desktop computers, distributed computing resource(s) 102 can include a diverse variety of device types and are not limited to any particular type of device. For example, distributed computing resource(s) 202 can include any type of computing device having one or more processing unit(s) operably connected to computer-readable media, I/O interfaces(s), and network interface(s). In some examples, the distributed computing resources 202 can be configured as a cloud services system.

In some examples, the environment 200 can also include computing device(s) 204 and networked device(s) 206. In some examples, the computing device(s) 204 can be a client device. In some examples, the computing device(s) 204 can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, and/or any other sort of computing device such as one or more separate processor device(s), such as CPU-type processors (e.g., micro-processors), GPUs, and/or accelerator device(s).

In some examples, the computing device(s) 204 can create, obtain, or have stored thereon unstructured data 208. In some examples, unstructured data 208 can be stored on any one or more of distributed computing resource(s) 202, computing device(s) 204, or networked device(s) 206. It is realistic that there would be unstructured data on any of distributed computing resource(s) 202, computing device(s) 204, or networked device(s) 206. In some examples, the networked device(s) 206 can have corporal data 210 stored thereon. In some examples, the corporal data 210 can be stored at the distributed computing resource(s) 202 and/or the computing device(s) 204.

In some examples, the corporal data 210 can include one or more of textual corporal data 210(1) (e.g., documents, web pages); tabular data 210(2) (e.g., web tables, relational databases); or other relational data such as graph data 210(3) (e.g., directional graphs, neural networks; form data 210(N); tab delimited files; metadata; textual representations, conversions, and/or textually-processed forms of video, audio, and/or images, etc. In some examples, corporal data can include unstructured and/or structured data. In some examples, the techniques discussed herein leverage structured data of the corporal data.

In some examples, the techniques discussed herein can be implemented on one or more of the distributed computing resource(s) 202, computing device(s) 204, or networked device(s) 206. In some examples, distributed computing resource(s) 202 and/or the computing device(s) 204 can have be programmed with all or part of a parsing and/or predicting framework 212 ("PPF") to accomplish the techniques discussed herein. In some examples, the PPF 212 includes the PPF 102 In some examples, portions of the techniques can be implemented by various ones of the distributed computing resource(s) 202 or the computing device(s) 204.

Example Device

Figure 3:
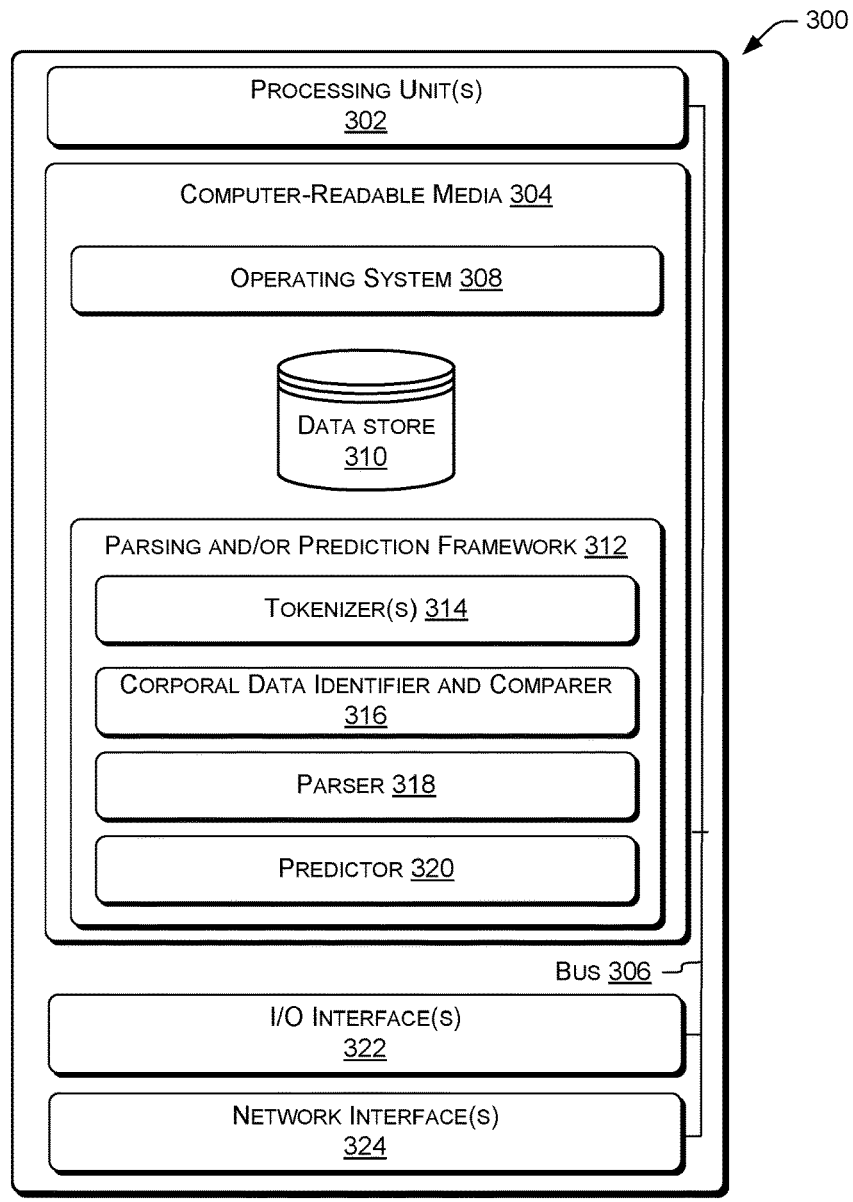
FIG. 3 is a block diagram of an example device configured to parse and/or predict by leveraging corporal data according to the techniques discussed herein.

FIG. 3 is a block diagram depicting select components of an example device 300 configured to facilitate data parsing and/or related data prediction by leveraging corporal data according to any of the techniques discussed herein. The example device 300 can represent one or more of distributed computing resource(s) 202, computing device(s) 204, or networked device(s) 206.

Example device 300 can include any type of computing device having one or more processing unit(s) 302 operably connected to computer-readable media 304. The connection may be via a bus 306, which in some instances may include one or more of a system bus, a data bus, an address bus, a PCI bus, a Mini-PCI bus, and any variety of local, peripheral, and/or independent buses, or via another operable connection. Processing unit(s) 302 can represent, for example, one or multiple microprocessors, controllers or any other suitable type of processors for processing computer executable instructions to control the operation of the device in order to facilitate cross-channel communication. In some examples, where a system on a chip architecture is used, the processing unit(s) 302 can include one or more fixed function blocks (also referred to as accelerators) which implement a part of the method by employing the CG system in hardware (rather than software or firmware).

The computer-readable media 304 includes two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/ or other types of physical machine-readable media suitable for storing electronic instructions.

In contrast, communication media embodies computer-readable instructions, data structures, program modules, and/or other data in a modulated data signal, such as a carrier wave, and/or other transmission mechanism. As defined herein, computer storage media does not include communication media.

In some examples, as shown regarding device 300, computer-readable media 304 can store instructions readable and/or executable by the processing unit(s) 302. Executable instructions stored on computer-readable media 304 can include, for example, an operating system 308, data store 310, parsing and/or prediction framework 312 ("PPF") (which may represent the parsing and/or prediction, and/or other modules, programs, and/or applications that can be loadable and executable by processing unit(s) 310 and/or accelerator(s) (e.g., operating systems, firmware).

In some examples, data store 310 includes data storage such as a database, data warehouse, and/or other type of structured or unstructured data storage. In some examples, data store 310 includes a relational database with one or more tables, indices, stored procedures, and so forth to enable data access. In some examples, the data store 310 can store corporal data and/or unstructured data. Data store 310 can store data for the operations of processes, applications, components, and/or modules stored in computer-readable media 304 and/or executed by processor(s) 302. Alternately, some or all of the above-referenced data can be stored on separate memories such as memories of the distributed computing resource(s) 202, computing device(s) 204, networked device(s) 206, and/or a memory of a processing unit.

In some examples, the PPF 312 can represent the PPF 102 and/or the PPF 212. In some examples, the PPF 312 can configure the processing unit(s) and/or the accelerator(s) 316 to obtain unstructured data; parsing the unstructured data to obtain a classified token; predict an attribute identifier and/or attribute value related to the classified token or a class parsed for the classified token; and/or otherwise configure the example device 300 to accomplish the techniques discussed herein. In some examples, there can be differences between a PPF of a client device and a PPF on a training, back-end, or distributed computing device. For example, the PPF of a client device can have components for capturing and relaying unstructured data and receiving and display structured data whereas a training or back-end PPF can have components for parsing, predicting, and/or training.

In some examples, the PPF 312 can include tokenizer(s) 314, a comparer 316, parser 318, and/or predictor 320. In some examples, the techniques can include more or less components and can be configured as fewer or more modules. As used herein, "tokenizer" can be hardware and/or software that implements a particular tokenization scheme (i.e., a specified method of breaking up strings or tokens into smaller tokens). In some examples, tokenizer(s) 314 can include one or more tokenizers corresponding to various regions and/or languages. In some examples, the various combinations of regions and languages can correspond to tokenizers that tokenize strings based on different languages, dialects, and/or idiomatic patterns of a particular language and/or region. For example, the tokenizers can be configured to tokenize for different languages, and multiple tokenizers can be configured to tokenize strings based on different regions. For example, the tokenizers can be configured to tokenize based on variations in vocabulary, grammatical idiosyncrasies, slang, etc. that varies between regions (e.g., a tokenizer for Spanish versus a tokenizer for English, a tokenizer that can handle Unicode inputs such as Japanese symbols, a tokenizer for Castilian Spanish versus a tokenizer for Mexican Spanish, a tokenizer for the Castilian Spanish of Barcelona (a city of Spain heavily influenced by Catalonian culture) that incorporates some Catalan vocabulary and grammar versus a tokenizer for Castilian Spanish of Malaga (another city of Spain heavily influenced by former Arabic rule and trade) that incorporates some Arabic and Andalusi Romance vocabulary).

In some examples, the PPF 312 can select one or more tokenizers tokenizer(s) 314 to tokenize unstructured data. In some examples the PPF 312 can select a tokenizer based at least in part on a region and/or language associated with the unstructured data. In some examples, the tokenizer(s) 314 can tokenize the reference record and/or other retrieved strings. In some examples, a tokenizer transforms a text-based record into a set of tokens. In some examples, tokens can be strings, individual words, sub-words, and/or individual symbols. Different tokenizers can define word boundaries differently (e.g., tokenize based on white space, natural language word breakers, etc.).

In some examples, the tokenizer(s) 314 can break the unstructured data up into tokens that correspond to words recognized as part of the vocabulary of the language corresponding to the region and/or language associated with the unstructured data. Therefore, in some examples, the PPF 312 can be configured to detect a region and/or language associated with the unstructured data. In some examples, the tokenizer(s) 314 can break the string up into multiple words or portions of words. In some examples, the PPF 312 can be configured to re-tokenize or perform multiple tokenization of the unstructured data at different stages of parsing and/or predicting in order to maximize a probability that a class or value should be associated with the unstructured data, to maximize a frequency with which a class or value is associated with the unstructured data, to minimize a tail size of a distribution of results, and/or a support metric for the probability.

In some examples, the PFF 312 can include a corporal data identifier and comparer 316. In some examples, the corporal data identifier and comparer 316 identifies corporal data that can be leveraged for particular unstructured data. For example, the corporal data identifier and comparer 316 can include one or more of searching, identifying, or token comparing components. In some examples, the corporal data identifier and comparer 316 can identify elements of corporal data that is relevant to structural data such as by searching appearances of tokens of the unstructured data in the corporal data. In some examples, the corporal data identifier and comparer 316 can identify whether the appearance of a token is as a class identifier or as a class value. In some examples, the corporal data identifier and comparer 316 can be used to calculate a frequency with which a token, combination of tokens, and/or arrangement of tokens appears in the corporal data (e.g., how often "Sofia" appears in the corporal data, how often "Sofia" and Barga" appears in the corporal data, and/or how often "Sofia Barga" appears in the corporal data). In some examples, the comparer 316 can include a fuzzy search module or a fuzzy compare module.

In some examples, the corporal data identifier and comparer 316 can calculate a support metric. For example, a probability, as used herein, can be a probability that a first token is related to a second token and the support metric can be based, at least in part, on a number of corporal elements that were used to derive the probability. For example, in instances of obscure names, a probability that a token is associated with a label, "name," could be high but the support metric for that probability could be low due to the low number of documents that support the probability that the token is associated with "name." For example, four out of a total of five elements that contain the token within the corporal data could include an association between the token and "name." This results in a high probability that the token is associated with name, but a low support metric for that probability since only five documents contain the token and/or because only four documents contain the association between the token and "name." In some examples, the PFF 312 can use the probability and/or the support metric to calculate weights to re-rank the probabilistic database for selecting which result(s) to associate with a token.

In some examples, parser 318 can calculate a probabilistic database to parse unstructured data and predictor 320 can calculate a probabilistic database to predict data related to the unstructured data and/or data parsed by the parser 318. In some examples, the parser 318 and/or the predictor 320 can make requests to the corporal data identifier and comparer 316 to generate probabilistic databases. In some examples, the parser 318 and/or the predictor 320 can form the probabilistic databased for a token-of-interest ("TOI"). In some examples, the PFF 320 can obtain the TOI from the unstructured data by tokenizer(s) 314. In some examples, the TOI is the unstructured data itself. In some examples, the parser 318 and/or the predictor 320 can generate a probabilistic database jointly based at least in part on the TOI and one or more of a constraint, additional data (e.g., data input by a user or retrieved ground truth data, other tokens of the unstructured data from which the TOI was derived), a class identifier (e.g., a class identifier previously parsed by parser 318), an attribute label associated with the TOI, or an attribute value associated with the TOI. In some examples, the parser 318 and/or the predictor 320 can create structured data from unstructured data using class identifiers and/or class values derived by parsing and/or predicting according to any of the techniques discussed herein. In some examples, the parser 318 and/or the predictor 320 can include directionality or other such metadata in the created structured data.

In some examples, the PFF 312 or portions of the PFF 312 such as, for example, the tokenizer(s) 314, a comparer 316, parser 318, and/or predictor 320 be implemented as hardware, such as, for example an integrated circuit or a specially configured processor such as, for example, one or more accelerators. In some examples, one or more accelerator can take the place of the processing unit(s) 302 or can be additionally coupled to components of the example device 300 by bus 306. In some examples, the configuration of the accelerator(s) can also take place of instructions stored on the computer-readable media 312. Accelerator(s) can include, for example, central processing unit ("CPU")-type processor(s), graphical processing unit ("GPU")(s), field-programmable gate array ("FPGA")(s), digital signal processing ("DSP")-type accelerator(s), and/or other accelerator(s). In some examples, the computer-readable media 312 can be accessible to an accelerator(s) and/or the processing unit(s) 302.

Some or all of computer-executable instructions and/or hardware implementations of the PFF 312 can be available to, accessible from, or stored on a remote device and/or distributed computing resources 202 and/or computing device (s) 204. In some examples, any number of modules could be employed and techniques described herein as employed by one or more modules can be employed by a greater or lesser number of modules.

Example device 300 can further include input/output ("I/O") interface(s) 322, to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In some examples, the I/O interface(s) 322 can allow the example device to communicate with one or more cameras and/or microphones to capture audio/video information.

Example device 300 can also include network interface(s) 324 to enable communications over network 204. Such network interface(s) 324 may include one or more network interface controllers (NICs) or other types of transceiver devices to send and receive communications over a network 204.

Example Techniques

Figure 4:
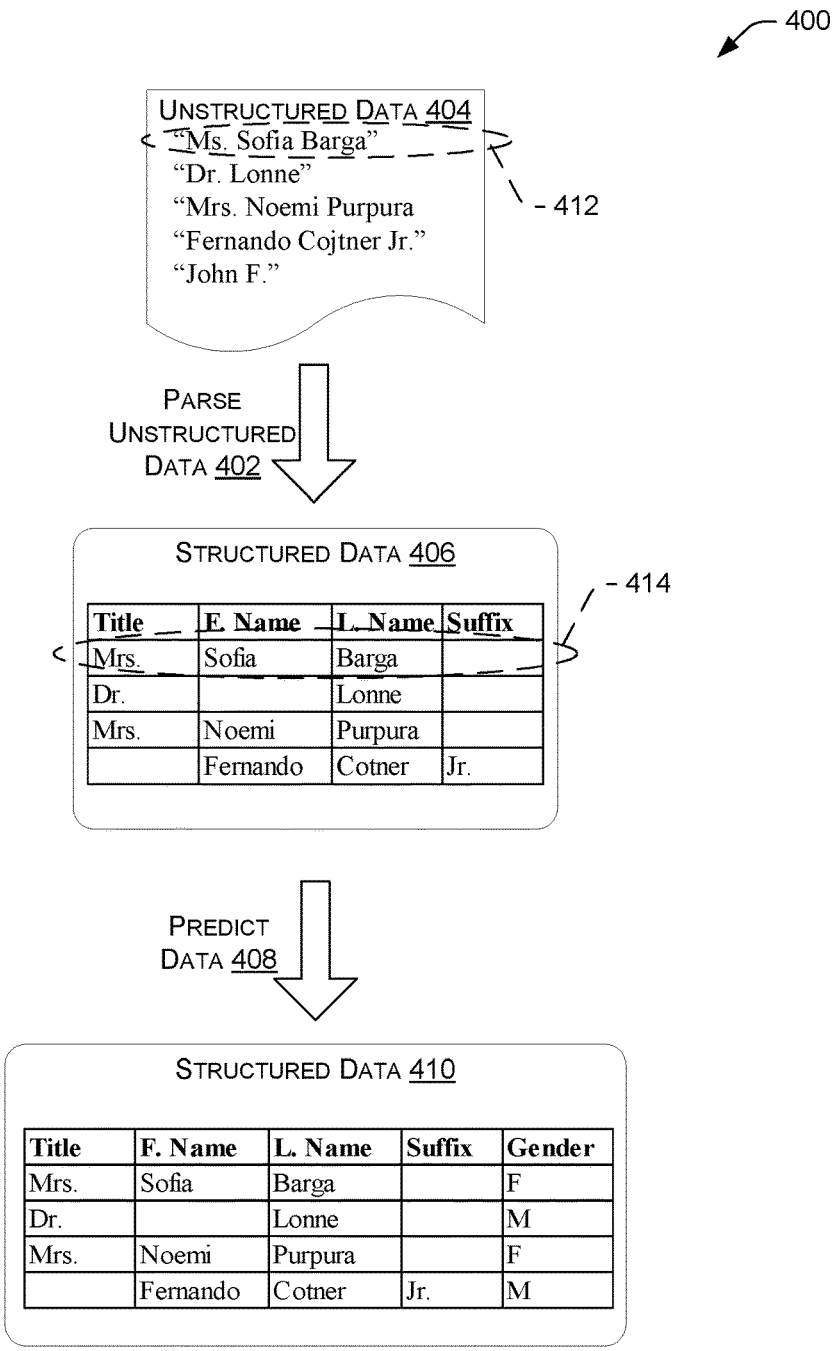
FIG. 4 is a flow diagram illustrating an example process to parse unstructured data and predict data that may be related to the unstructured data.

FIG. 4 depicts example results of an example technique 400 for parsing (402) unstructured data 404 to obtain structured data 406. In some examples, this can be the end of the operation and the structured data 406 can be output by the PFF 312. In some examples, the example technique 400 can further include predicting data (418) that may be related to the unstructured data 404 (or, equivalently, the structured data 406). For the sake of readability, it is contemplated that predicted data can be related to a structured representation of unstructured data, so references to predicted data being related to unstructured data are to be understood as relating to a structured form of the unstructured data, such as the relation of structured data 410 to structured data 406 and unstructured data 404.

In some examples, predicted data can be added to the structured data obtained by parsing 402. In some examples, predicted data can be associated with either structured data or unstructured data in any manner contemplated herein. Although the PPF 312 can structure data according to any schema (e.g., table, database, directed graph, network, labeling, creating metadata, creating bags or other set structures), for ease of discussion and illustration, the example structured data represented in a majority of the figures are tables, although any structure can be employed by the techniques discussed herein.

Parsing unstructured data at 402 can include tokenizing data (e.g., tokenizing "Mrs. Sofia Barga" into "Mrs.", "Sofia", and "Barga"). Tokens of unstructured data can individually be considered unstructured data, as can the group of strings represented at 404. In some examples, if unstructured data 404 is received as a group of unstructured data, as depicted at 404, then the structured representation of the unstructured data, example structured data 406, can include class identifiers all of unstructured data 404. For example, although the example parsing 402 did not identify a class identifier, "Suffix", for any of the tokens of the example portion 412 of the unstructured data 404, "Mrs. Sofia Barga", the example structured data representation 414 for "Mrs. Sofia Barga" can include the class identifier, "Suffix", since the class identifier "Suffix" was identified by the parsing 402 for another portion of the unstructured data 404 of which example portion 412, "Mrs. Sofia Barga", is associated by virtue of its inclusion in the same unstructured data 404. In some examples, the PPF 312 can generate structured data obtained from a same location, obtained as part of a same stream of data, obtained from a same file or portion of a file, etc. in this manner (i.e., including all of the class identifiers that are identified for the unstructured data).

In some examples, a subset of the class identifiers can be included in the structured data (e.g., for a subset of the unstructured data).

In some examples, the PPF 312 can predict data 408 using one or more parts of the unstructured data 404 and/or the structured data 406 (i.e., parsed data) such as, for example, tokens of the unstructured data 404 or class identifiers of the structured data 406 (note that the tokens of the unstructured data become values of the structured data 406 and attribute labels and attribute values are terms relative to a TOI). In the example depicted in FIG. 4, the structured data 410 the PPF 312 produced as a result of predicting at 408 includes latent data regarding the gender associated with the unstructured data. Note that the data is latent in that it does not appear in the unstructured data.

In some examples, the PFF 312 can predict class identifiers and/or class values related to one or more portions of the unstructured data and/or the structured data based at least in part on corporal data. For example, the PFF 312 could detect from the corporal data that the class identifier "Gender" is commonly associated with one or more class identifiers "title", "F Name", "L Name", "suffix", some combination thereof, and/or some arrangement of a combination thereof and/or tokens of the unstructured data 404. In some examples, the PFF 312 can determined that a class identifier and/or class value is "commonly associated" with other data when the class identifier and/or class value is associated with a probability, frequency, and/or support metric that exceeds a threshold and/or is a top-k result in the probabilistic database generated for the prediction.

In some examples, a user can input a target attribute for which the PPF 312 can predict values. For example, in the example shown in FIG. 4, a user could have provided the attribute "Gender" and the PFF 312 could have predicted the values populating the rows beneath the "Gender" column in the structured data 410. In some examples, a use-context can be used to derive a target attribute for which the PPF 312 can predict values. For example, a user could be writing an email addressed to an email address to which the user has never sent an email. In this case, the user may not know how to properly address the individual associated with the email address based merely on their name and/or their email (e.g., the user may not know what title and/or suffix to use). This is a particular use context for which a "Gender" prediction might be helpful. In this example, the PFF 312 could predict a Gender for the individual to which the email is being addressed based on the information available locally or via a network and provide this prediction to the user. In some examples, the PFF 312 can provide a metric of the confidence with the prediction. In some examples, a confidence can be based at least in part on a probability associated with the predicted value in the probabilistic database derived for the prediction and/or the support metric associated with the predicted value in the probabilistic database derived for the prediction. Note that the information regarding the individual to which the email is being sent composes yet another part of the corporal data available to the PFF 312.

In some examples the PFF 312 can be trained with corporal data structure. In some examples, the PFF 312 can be trained so that the PFF 312 can calculate a confidence metric for parsed and/or predicted data based at least in part on commonly associated class identifiers. For example, the PFF 312 can be trained to recognize that "F Name" and "L Name"; or "F Name", "L Name" and "address" are commonly associated and therefore a parsing or prediction that could result in an assignment of one or of those class identifiers when another one of the group is present can produce a higher confidence score. In some examples, the PFF 312 can select the class identifier, attribute identifier, and/or attribute value based at least in part on one or more of the probability, frequency, support metric, or confidence metric. In some examples, the PFF 312 can include machine learning components such as, for example, a directed graph, a neural network, a segmenting component, a clustering component, and/or a classifier. In some examples, the confidence metric can be based on fuzzy matching metrics such as, for example, edit distance. Such metrics are described in more detail in U.S. patent application Ser. No. 15/195,923. In some examples, one or more of the probability, the support metric, or the confidence metric can be normalized.

In some examples, parsing 402 and/or predicting 408 can be conducted at different granularities. For example, the parsing 402 and/or predicting 408 can be conducted for individual tokens of the unstructured data 404 and/or structured data 406 and/or the parsing 402 and/or predicting 408 can be conducted for multiple tokens of the unstructured data 404 and/or structured data 406.

Figure 5:
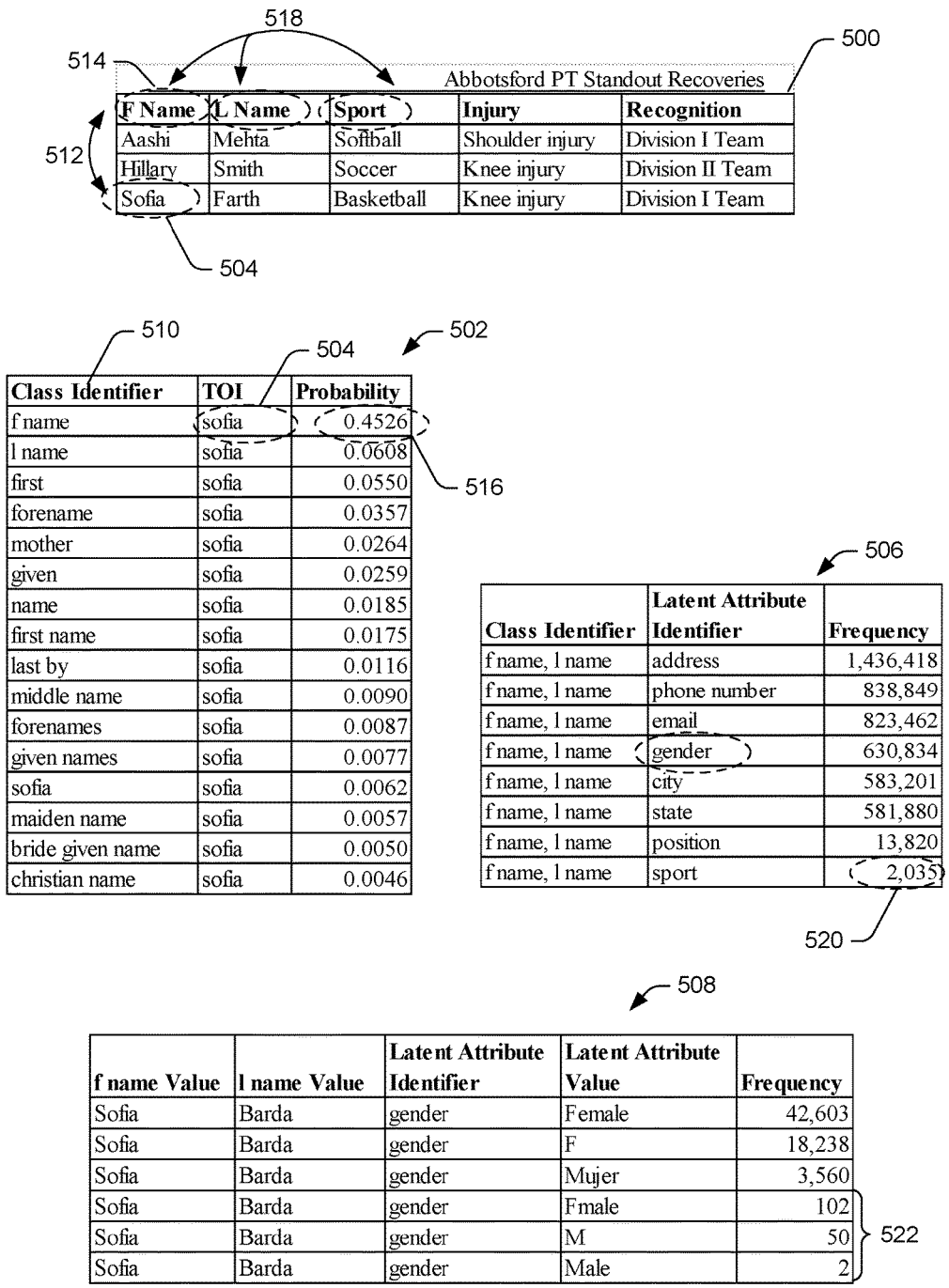
FIG. 5 is a representation of an example instance of an element of corporal data and example representations of probabilistic databases derived from the corporal data.

FIG. 5 includes an example element of corporal data 500, an example probabilistic database ("PD") 502 for a token-of-interest ("TOI") 504, "Sofia" to find class identifiers associated with "Sofia", an example PD 506 for identifying a latent attribute related to the class identifiers "F Name" and "L Name", and an example PD 508 for identifying a latent attribute value for the TOIs "Sofia" "Barga" and the latent attribute, "Gender". In some examples, the PPF 312 can generate a PD such as example PD 502 to parse unstructured data. In some examples, the PPF 312 can generate the PD such as example PD 502 to predict data related to the unstructured data. In this example, the PD is generated to parse and/or predict a class identifier for a TOI. TOIs can include tokens of unstructured data, class attributes, and/or class values.

In some examples, the PPF 312 generates PDs for an input TOI and output class identifier or class value. In the depicted example, the PPF 312 generated the example PD 502 for one TOI, "Sofia", of the unstructured data, "Mrs. Sofia Barga" from FIG. 4 to find class identifiers associated with the TOI. In some examples, to generate a PD, the PPF 312 can identify class identifiers or class values ("output tokens") associated with the TOI (e.g., via structure of the corporal data), calculate a frequency with which individual output tokens are associated with the TOI, and/or derive a probability that an individual output token is associated with the TOI based at least in part on the frequency. FIG. 5 illustrates the results of such an operation in the columns of PDs 502, 506, and 508 (note that PDs 506 and 508 illustrate an example where the PDs are generated based on frequency although the PDs could additionally or alternately be generated and ranked based on a probability).

In some examples, the PPF 312 can also calculate a support metric for individual output tokens. In some examples, the support metric for an output token can be based on one or more of a number of elements of corporal data that contain the output token, a quantification of the share the elements of corporal data that contain the output token compose of the total number of elements of corporal data used to develop the PD (e.g., the token is associated with the output token x number of times out of y number of total times that the token appears in the corporal data), or a t-test using one or more portions of the PD as the functions of the t-test. For example, for a token that appears 1,000,000 times in the corporal data and of those times, is associated with an output token 990,000 times, there is both a high probability and high support for the token being associated with the output token. In another example where a token appears 10 times in the corporal data and, of those times, is associated with an output token, 9 times, there is a high probability that the token is associated with the output token but low support. In some examples, the probability can be normalized and the support can be used to effect the normalization of the probability. In some examples, the support can be separately considered and/or the support can weight the probability. In some examples, the PPF 312 can derive a probability that an individual output token is associated with the TOI additionally based on the support metric.

In the example illustrated in FIG. 5., the class identifiers identified by the PPF 312 as being associated with the TOI 504 are listed in column 510 and are ranked in order of probability of association with the TOI 504. The double-headed arrow between the column header of the example element of corporal data 502, "F Name", and the row entry of the example element of corporal data 502, "Sofia" highlights an association 512 between the class identifier 514, "F Name", and the TOI 504. In this example, the association 512 contributes to the probability 516 (i.e., the probability that "F Name" is associated with "Sofia" or, equivalently, a proper characterization of what the token "Sofia" is). This is an example of an association for which the PPF 312 can search and calculate a frequency within the corporal data.

In some examples, the PPF 312 can accept constraints (e.g., additional tokens) to limit the PD. In some example, a constraint is provided by a user and/or a use context. In some examples, the constraint can be used to limit the corporal data used by the PPF 312 to generate PDs. For example, if a constraint includes a location the PPF 312 could use corporal data associated with the location to generate a PD. In some examples the PPF 312 could additionally or alternatively generate the PD from corporal data that contains both the constraint and the TOI. In some examples, the PPF 312 can use more than one token to generated a PD (e.g., a constraint, token(s) of unstructured or structured data). For example, to generate a PD for more than one token, the PPF 312 can identify corporal data that contains the multiple tokens, the multiple tokens and an association between the tokens, and/or a particular arrangement of the multiple tokens. For example, the PPF 312 could generate PDs based on corporal data that contains the TOIs "Sofia" and "Barga", or based on corporal data that contains the particular arrangement "Sofia Barga", or based on corporal data that contains instances of "Barga" and instances of "Sofia" associated with "F Name".

FIG. 5 also includes a PD 506 generated to identify latent attribute identifiers that may be associated with the class identifiers "F Name" and "L Name". The triple-headed arrow between the column headers of the example element of corporal data 502, "F Name" and "L name", and the column header, "Sport" reflects an association 518 between the class identifiers, "F Name" and "L Name", and the class identifier, "Sport". In some examples, "Sport" can, by virtue of association 518, be considered a candidate latent attribute identifier related to "F Name" and "L Name". In this example, association 518 contributes to the frequency 520 of instances that "F Name" and "L Name" are associated with "Sport" in corporal data.

In some examples, PPF 312 can be trained on indications of usefulness provided by a user or by successful completion of an action regarding the data by a computing device in order to select a latent attribute identifier for which to generate a PD. For example, the PPF 312 can be previously trained using user feedback, which can permit the PPF 312 to know that a latent address, phone number, or an email associated with unstructured data may be less useful to a user than a gender associated with the unstructured data (perhaps because a user can more obtain this information). Therefore, the PPF 312 can generate a PD such as PD 508 that is based on associations between a latent attribute identifier and/or one or more class values in corporal data (e.g., values corresponding to the class identifiers "F Name" and "L Name" or, put differently but equivalently, portion(s) of the unstructured data) in order to identify a latent attribute value. In some examples, one or more of a class value, a class identifier, or a constraint can be used to generate the PD 508.

In some examples, distribution data of the PDs can also be leveraged. For example, the PPF 312 can use tail data, such as tail data 522 to determine misspellings in the TOI, misspelled class identifiers and/or values, potential antonyms for binary class data, or to determine that the unstructured data contains data that infrequently appears in the corporal data. In some examples, the PPF 312 can parse and/or predict data for tokens that do not appear in the corporal data by parsing and/or predicting for other tokens of the unstructured data to increase probabilities, confidence metrics, and/or support metrics corresponding to parsing or predicting for the token that does not appear in the corporal data. In some examples, for a token that does not appear in the corporal data, the PPF 312 can generate PDs using classifier identifiers and/or classifier values of a PD generated for the token to find associations between classifier identifiers and/or classifier values of the PD generated for the token. The number of associations between the classifier identifiers and/or classifier values themselves and/or the particular associations themselves can be an indication of a relational theme.

For example, in regard to PD 502, if "Sofia" was a token that rarely appeared in the corporal data and "Barga" never appeared in the corporal data, the PPF 312 could generate PDs to find class identifiers associated with the class identifiers identified in the PD 502. Identifiers that are associated with a same concept are unlikely to be associated (e.g., "F name"," "First", "Forename", and "First Name" are unlikely to be associated with each other since it is unusual for these fields to be structurally related), so the PPF 312 can be trained on identifiers and what different collections of identifiers can signify (i.e., a theme) so that given a subset of known class identifiers, an unknown identifier can be inferred by the PPF 312. For example, if the PPF 312 included a trained machine learning component and the PPF 312 parsed unstructured data and identified four tokens of the unstructured data as having a high probability of being a first name, a street, a city, and a state but one of the tokens had one or more of a low probability, a low support metric, or a low confidence metric, the PPF 312 could identify, by the trained classifier, that there is a likelihood, given the identified class identifiers that the remaining class identifier should be a last name identifier.

In some examples, to identify a theme, the PPF 312 can use natural language processing to identify a genus of the class identifiers and/or values or the PPF 312 could identify recurrent tokens within the tokens themselves (e.g., "name" within PD 502). In some examples, the PPF 312 can use the theme as a constraint in generating PDs.

In some examples, the PPF 312 can generate a PD similar to PD 506 to predict latent attribute identifies and a PD similar to PD 508 to predict latent attribute values. In some examples, to identify a latent attribute value related to a TOI, the PPF 312 predicts an attribute identifier and then predicts that attribute value corresponding to that attribute identifier.

In some examples, the PPF 312 can predict the attribute value itself if the attribute identifier is known (e.g., the attribute identifier is provided by a user, the attribute identifier is inferred from a use context, the attribute identifier is inferred from a theme, the attribute identifier is inferred from an assumed arrangement).

In some examples, the PPF 312 can make predictions based on corporal data by generating PDs for attribute identifiers and/or attribute values that may be associated with a class identifier and/or a class value as discussed above. PD 506 and PD 508 can serve this function (i.e., PD 506 can be used to predict attribute identifiers associated with a class identifier and PD 508 can be used to predict an attribute value for an attribute identifier and tokens of the structured or unstructured data). In some examples, the PPF 312 can include a classifier such as, for example, a Naïve Bayes classifier. For example, the following constraint can be used to $$\text{classify}(f_1, \ldots, f_n) = \operatorname{argmax}_c \frac{p(C=c) \prod_{i=1}^{n} p(F_i = f_i \mid C = c)}{\sum_d P(C=d) \prod_{i=1}^{n} p(F_i = f_i \mid C = d)}$$

where $f_i$ is the $i^{th}$ instance feature (i.e., a TOI), $F_i$ is the $i^{th}$ feature, and C is a set of possible classes. For example, for the tokens "John" and "Smith", this classification by the classifier can be represented as classify(john,smith)=arg max{p(C=m)p(fname=john|C=m)p(lname=smith|C=m), p(C=f)p(fname=john|C=f)p(lname=smith|C=f)}. In some examples, p(C=c) can be computed from the corporal data from a frequency with which a TOI is associated with a class identifier. For example, the PPF 312 can generate a PD similar to PD 502 where the class identifier is held constant and the value can change instead of holding value constant. In other words, the PPF 312 can calculate how often different values are associated with a class identifier and use this to calculate a probability that the class identifier is associated with a value. In some examples, $p(F_i=f_i|C=c)$ can also be derived from the corporal data. In some examples, the PPF 312 can calculate $p(F_i=f_i|C=c)$ by generating a PD based on the class identifiers and class values.

In some examples, the PPF 312 can make predictions based on corporal data by training classifiers for prediction attributes.

In some examples, the PPF 312 can repeat parsing and/or predicting for one or more tokens of the unstructured data to improve the parsing and/or predicting. In some examples, the PPF 312 can repeat parsing and/or predicting based on one or more of a user indication, a low probability, a low support metric, or a low confidence metric.

FIG. 6A-FIG. 6G depict different example assignment techniques (600-606) for selecting which structural data to associate with TOIs, whether the TOIs are tokens of unstructured data, class identifiers, and/or class values. FIG. 6A-FIG. 6G use the unstructured data, "Mrs. Sofia Barga" as the example input. Prior to the example techniques illustrated by FIG. 6A-FIG. 6G, the PPF 312 can tokenize the unstructured data into three tokens: "Mrs.", "Sofia", and "Barga" and generate PDs for the tokens to identify class identifiers that may be related to the tokens, similarly to PD 502, in order to parse the unstructured data. Once the PDs are generated, it can be difficult to decide which of the identified possible class identifiers to associate with the tokens and merely assigning the most probable class identifier of the PDs generated for each token can lead to inaccuracy in some instances. It is contemplated that these techniques can be used similarly for assigning attribute identifiers and/or attribute values to a token as well, which can include generating PDs similar to PD 506 and PD 508.

Figures 6A, 6B:
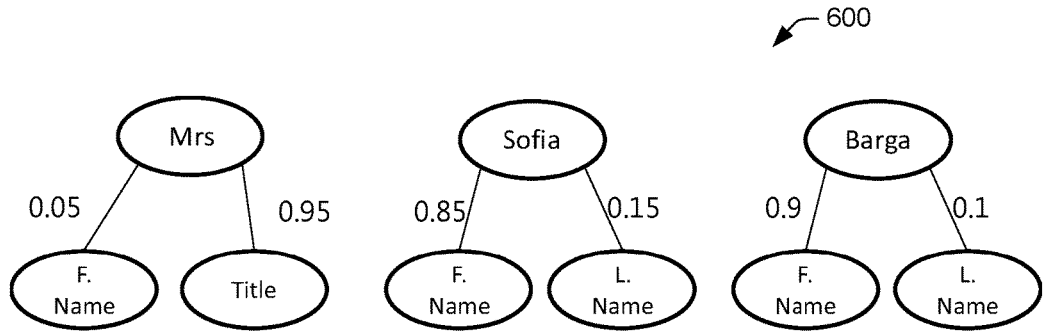
FIG. 6A-FIG. 6G are diagrams of example assignment schemes for selecting which parsed and/or predicted data to associated with portions of the unstructured data.

FIG. 6A depicts an example assignment technique 600 for assigning a class identifier to the unstructured data based on a maximum probability. FIG. 6A depicts example probabilities next to the edges of the candidate associations between the candidate class identifiers and the top-two class identifiers of the respective PDs, ranked by probability. In some examples, the PPF 312 can find a top-k number of class identifiers and/or class values associated with the output tokens. In some examples, the PPF 312 can associate a class identifier having a maximum probability with a token (e.g., "Title" with "Mrs.", "F. Name" with "Sofia", "F. Name" with "Barga"). However, this can lead to inaccuracy, as the parsing of "Barga" illustrates. In some examples, the PPF 312 can vary the assignment scheme based on machine learning. In some examples, the PDs can be additionally or alternatively weighted or ranked based on a support or confidence metric.

FIG. 6B depicts another example assignment technique 602 for assigning a class identifier to the unstructured data based on a combined probability that the assignments are correct. In some examples, the combined probability can include, be weighted by, or replaced by one or more of a support or confidence metric. In this example, the rows represent candidate assignment combinations of class identifiers 608 to the tokens (610(1)-610(3)) of the unstructured data and the combined probability 612 that the assignment combination is accurate. In some examples, the combined probability can be a multiplication of the probabilities of the respective assignments based on the probabilities calculated for the PDs for the tokens. In some examples, other statistical metrics can be used such as, for example, a t-test. "Barga" continues to be problematic in this instance since two of the tokens have a class identifier for which a high probability was calculated (i.e., it is highly probable that "F. Name" is associated with both "Sofia and "Barga" according to the generated PDs).

In some examples, the PPF 312 can be trained to know what identifiers are unlikely (or likely) to co-occur in data. For example, class identifiers corresponding to a first name almost never co-occur, whereas class identifiers corresponding to phone numbers frequently co-occur. In some examples, the PPF 312 can use one of the following assignment techniques when at least two class identifiers overlap in a data context that the PPF 312 has been trained to categorize as low co-occurrence for the class identifiers. In some examples, the following assignment techniques can be used instead of the above techniques described in regards to FIGS. 6A and 6B.

Figure 6C:
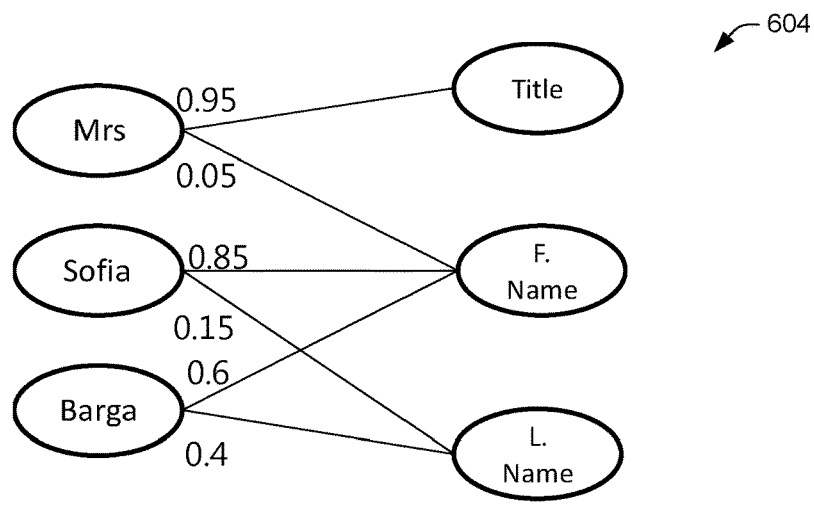

FIG. 6C depicts an example assignment technique 604 for assigning a class identifier to the unstructured data based on solving a bipartite matching problem to maximize the weights of edges, where the edge weights are one or more of the probabilities, support metrics, and/or confidence metrics. In this example, the PPF 312 can enforce two rules: every token must be connected by an edge and class identifiers can only be used once at most.

Figure 6D:
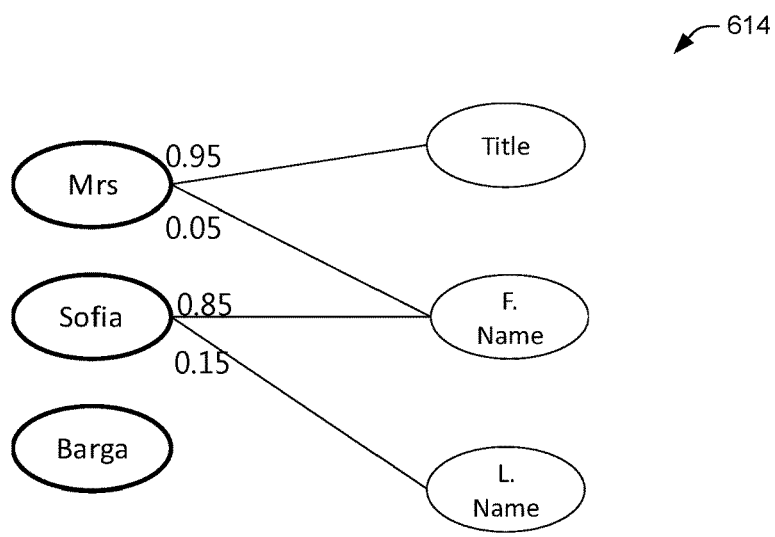

FIG. 6D depicts an example resultant assignment 614 based on solving a bipartite matching problem that conforms to the constraints described above. In some cases, this assignment technique can fail to assign a class identifier to a token if the token does not co-occur with class identifiers from the PDs. In some examples, to remedy this the PPF 312 can base the assignment at least in part on an arrangement of the unstructured data or arrangement of corporal data.

Figure 6E:
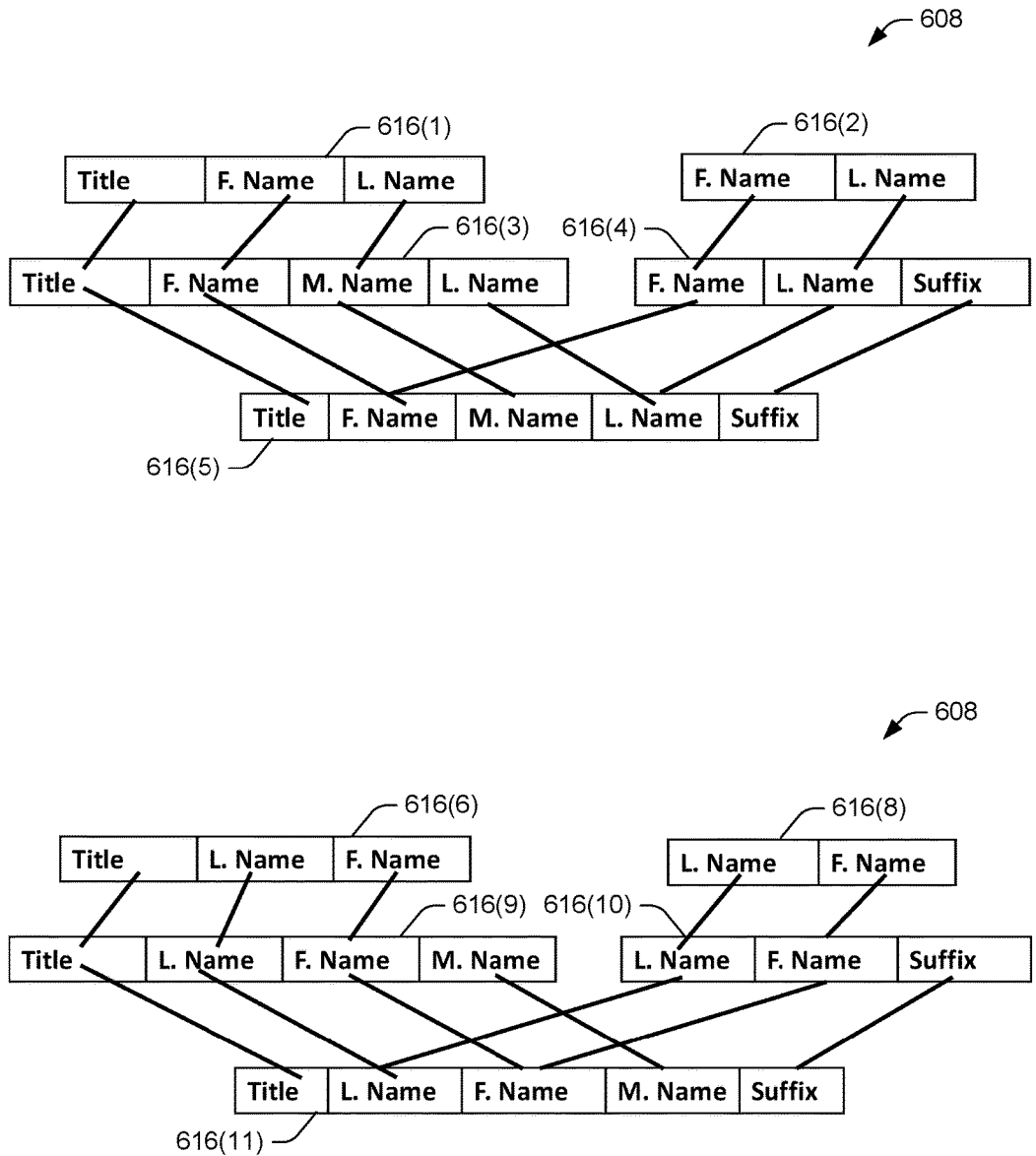

FIG. 6E depicts example class identifier arrangements 616(1)-(11) (i.e., orders of class identifiers relative to each other) and permutations of those arrangements. In some examples, the PPF 312 can compute common input unstructured data arrangements for specified class identifiers using structure in the corporal data. In some examples, the PPF 312 can use an arrangement or a permutation of an arrangement that matches a number of the class identifiers. In some examples, the PPF 312 can "fit" one of these arrangements to the data with more accuracy if one or more of the tokens of the unstructured data can be parsed with accuracy and the position of the token that can be parsed accords with an expected position in the arrangement. Note that permutations of example class identifier arrangements 610(5) and example class identifier arrangement 610(11) differ fundamentally by two common alternate representations of names: first name before last name or last name before first name.

Figure 6F:
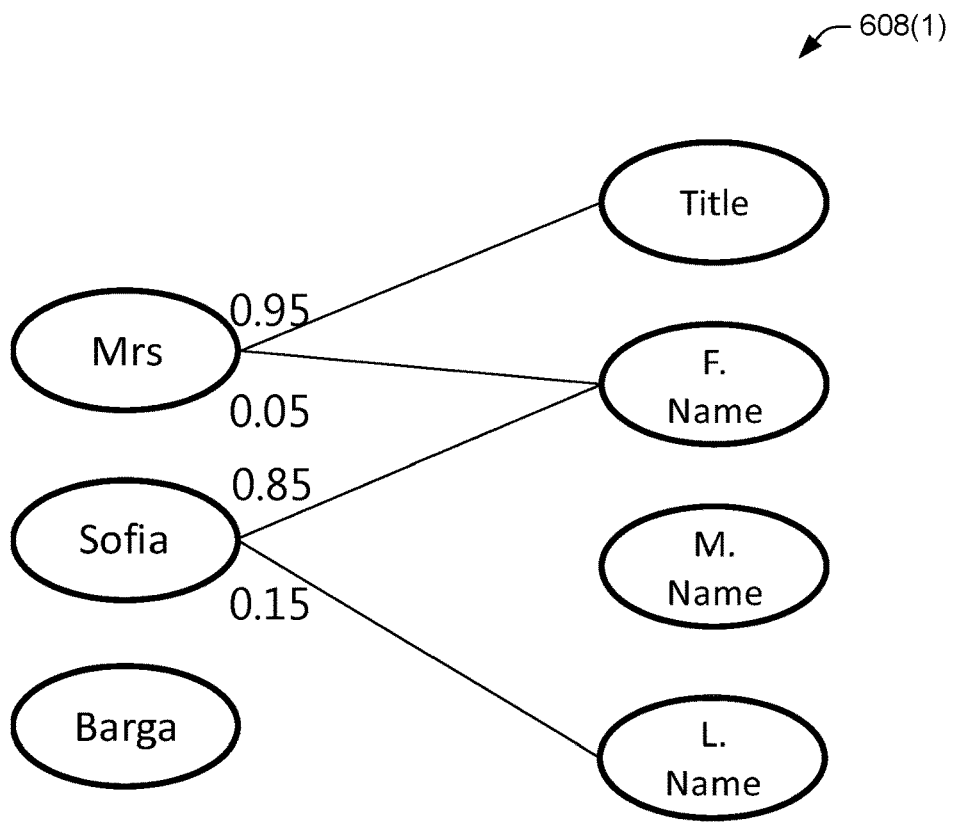

FIG. 6F depicts a first operation 608(1) for an example assignment technique 608 for assigning a class identifier to the unstructured data based on an assumed arrangement, such as one of the arrangements depicted in FIG. 6E. In some examples, as a first operation of this example technique, the PPF 312 can select an assignment pattern to maximize the weight of the edges between tokens and label pairs in the PD without regard to the input structure, as illustrated in FIG. 6F. As FIG. 6F also illustrates, these constraints will, at times, keep a token from being assigned a class identifier.

Figure 6G:
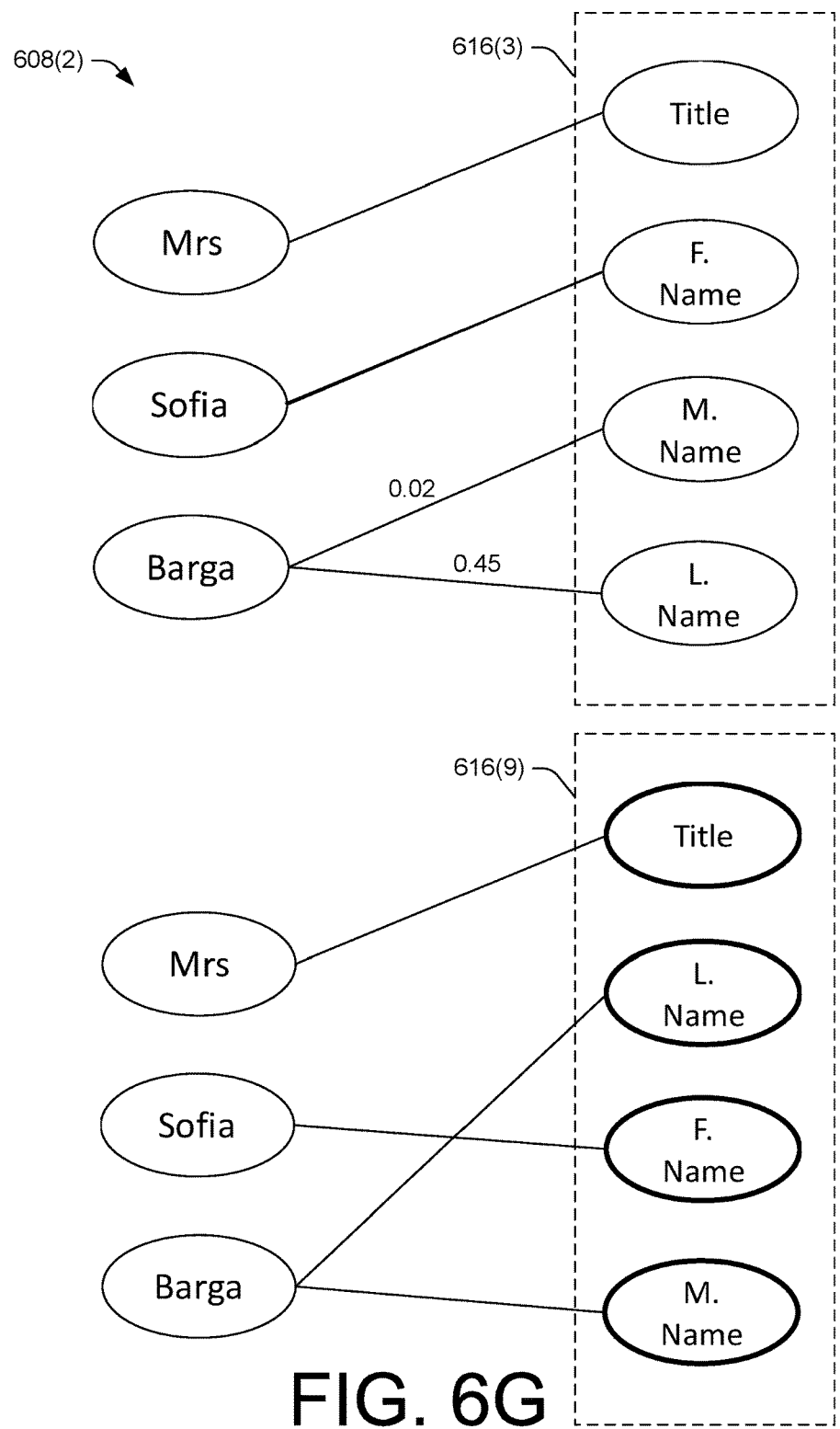

FIG. 6G depicts a second operation 608(2) for an example assignment technique 608 for assigning a class identifier to the unstructured data based on an assumed arrangement, such as one or more of the arrangements depicted in FIG. 6E. In some examples, the PPF 312 can compare results across multiple arrangements and choose the assignment that yields a highest probability for the as-yet assigned token ("Barga" in this case). FIG. 6G depicts two alternate second operations based on two different assumed arrangements, 616(3) and 616(9). In some examples, as a second operation of this example technique, the PPF 312 can associate any unlabeled token to every unassigned class identifier of the assumed arrangement. In this example, for assumed arrangement 616(3), the second operation includes associating "Barga" with "M. Name" at the third position and "L. Name" at the fourth position of the arrangement 616(3) and for assumed arrangement 616(9), the second operation includes associating "Barga" with "L. Name" at the second position of the arrangement 610(9) and "M. Name" at the fourth position of the arrangement 610(9).

In some examples, the second operation of this example technique includes selecting an assumed arrangement with the fewest crossing edges as the assignment arrangement to use for the unstructured data. In this example, arrangement 616(3) does not include any crossing edges and arrangement 616(9) includes one crossing edge, so the PPF 312 would choose arrangement 616(3) to assign the class identifiers to the tokens of the unstructured data to obtain the structured data. In some examples, tokens unassigned at the first operation may still have multiple options for assignment, as does "Barga". In these instances, the PPF 312 can generate a PD for the remaining token as a function of the class identifiers to which the token may be assigned. In this example, the PPF 312 can generate from corporal data probabilities that "Barga" is associated with "M. Name" or with "L. Name". The PPF 312 can then assign the class identifier to the remaining token based on a maximum probability (or, in some examples, additionally or alternatively a support metric and/or a confidence metric). In some examples, the PPF 312 can compare the relative probability of the class identifiers in matching.

In some examples, when the PPF 312 is trying to predict an attribute value, the PPF 312 can use the target attribute identifier as an additional constraint for generating PDs (e.g., the PPF 312 can require that an element of the corporal data also contain an association with the constraint). According to this example, assigned class identifiers may vary.

Figure 7A:
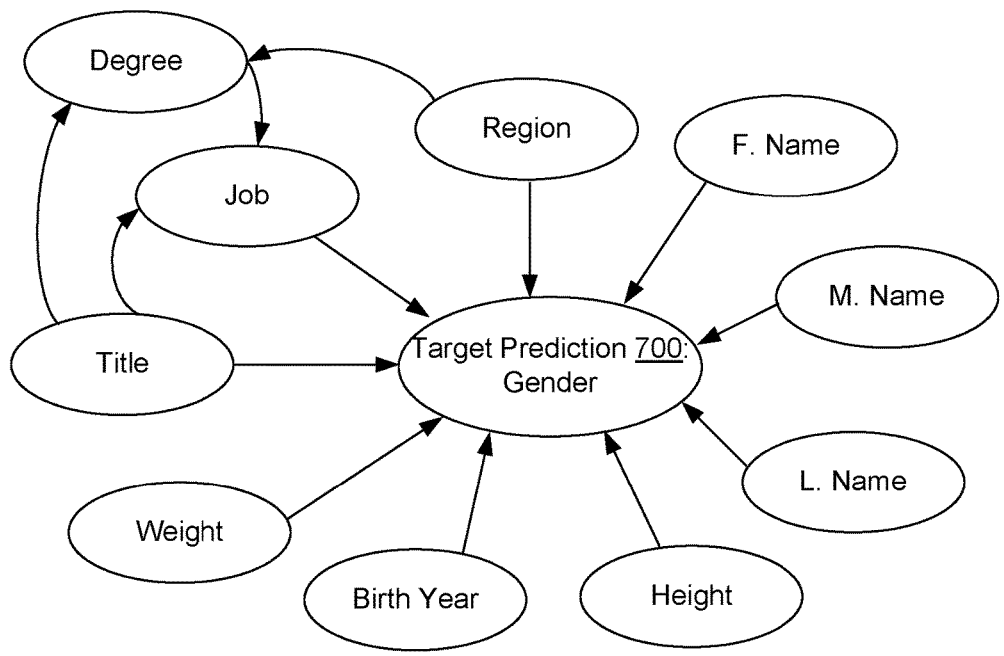
FIG. 7A is a block diagram of an example target attribute and class identifiers that can help predict the attribute value of the target attribute.
Figure 7B:
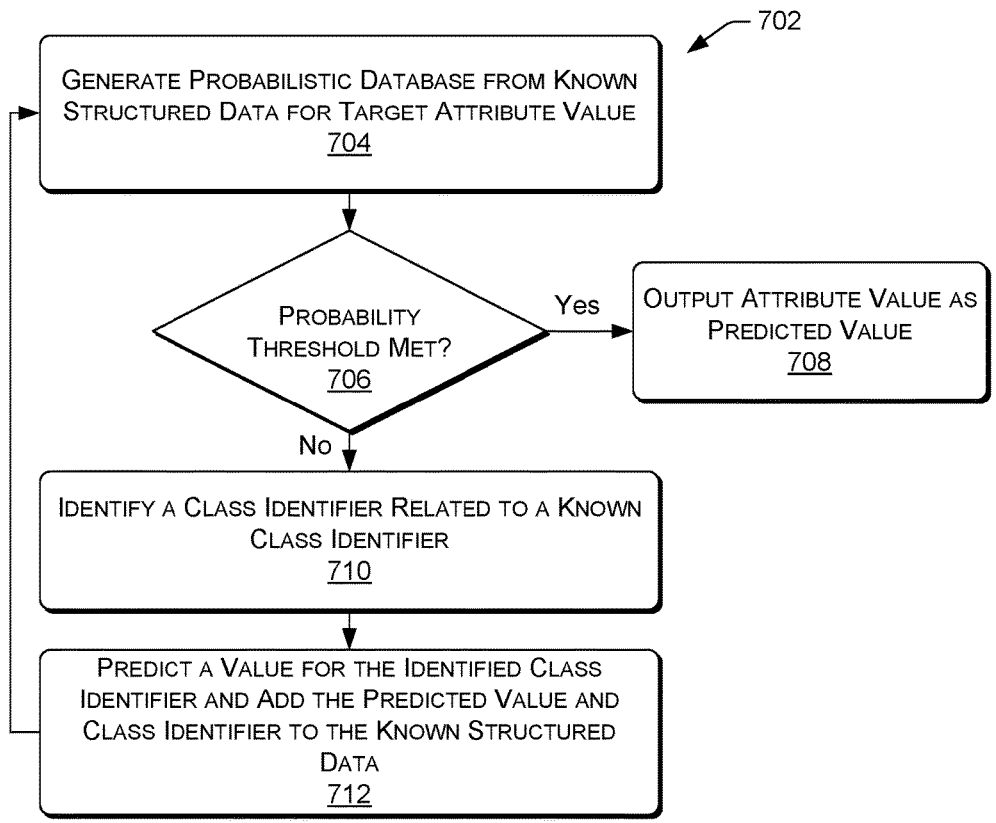
FIG. 7B is a flow diagram illustrating an example process to predict the target attribute of FIG. 7A with accuracy.

FIG. 7A depicts a block diagram of an example target attribute 700 and class identifiers that can help predict the attribute value of the target attribute and FIG. 7B depicts an example a process 702 to predict the target attribute with accuracy. The following discussion refers to both FIG. 7A and FIG. 7B. In some examples, the target attribute is identified by the PPF 312, as discussed above in regard to identifying gender from a PD of candidate attribute identifiers that may be related. In some examples, the target attribute identifier is otherwise identified as discussed herein. In some examples, the PPF 312 can identify class identifiers that may help accurately predict the target attribute value by generating a PD from the corporal data that includes associations between the target attribute label and other attribute labels. In some examples, the PPF 312 can leverage any subset of received structured data to predict the target attribute. In some examples, the PPF 312 can implement process 702 to predict the target attribute and to increase the prediction accuracy.

At operation 704, the PPF 312 can generate a PD from structured data (e.g., data parsed and/or predicted by the PPF 312) for the target attribute value (i.e., "gender" in the depicted example) based on known class values of the structured data (e.g., "Sofia", "Barga", "Seattle"). In other words, the PPF 312 can generate the PD looking for values associated with the class identifier "gender" and associated with is associated values of the known (or current) structured data. In some examples, the PPF 312 can return as the predicted target attribute value the value in the generated PD that has a highest probability, support metric, and/or confidence metric according to any technique discussed herein.

In some examples, the PPF 312 can include in process 702 operation 706. At operation 706, the PPF 312 can determine whether a probability, support metric, and/or confidence metric of values of the generated PD meet or exceed a threshold probability, support metric, and/or confidence metric. If the threshold probability, support metric, and/or confidence metric is met or exceed then the PD can complete operation 708 and output a value in the generated PD that has a highest probability, support metric, and/or confidence metric according to any technique discussed herein.

If the threshold probability, support metric, and/or confidence metric is not met, then the PD can complete operation 710. At operation 710, the PPF 312 can identify a class identifier related to one or more known class identifiers according to any of the techniques discussed herein. For example, the PPF 312 could generate a PD similar to PD 506 to identify an attribute identifier associated with "f name" and "l name". In some examples, the PPF 312 can conduct multiple iterations of predicting in this manner in order to increase accuracy or in order to identify more hidden inferences between data. For example, referring to the graph in FIG. 7, iterating this process based on "Title" and/or "Region" would help predict a value of "Job" more accurately, which, in turn, may help predict a value of "Gender" more accurately.

Once the PPF 312 identifies a class identifier, the PPF 312 can continue to operation 712. At operation 712, the PPF 312 can predict a value for the class identifier identified at operation 710 according to any of the techniques discussed herein. Once the PPF 312 predicts a value for the class identifier, the PPF 312 can add the identified class identifier and predicted value to the known structured data. In some examples, the PPF 312 can then return to operation 704 to re-attempt to predict the target attribute value and achieve a probability, support metric, and/or confidence metric that exceeds the threshold.

Example Processes

Figure 8:
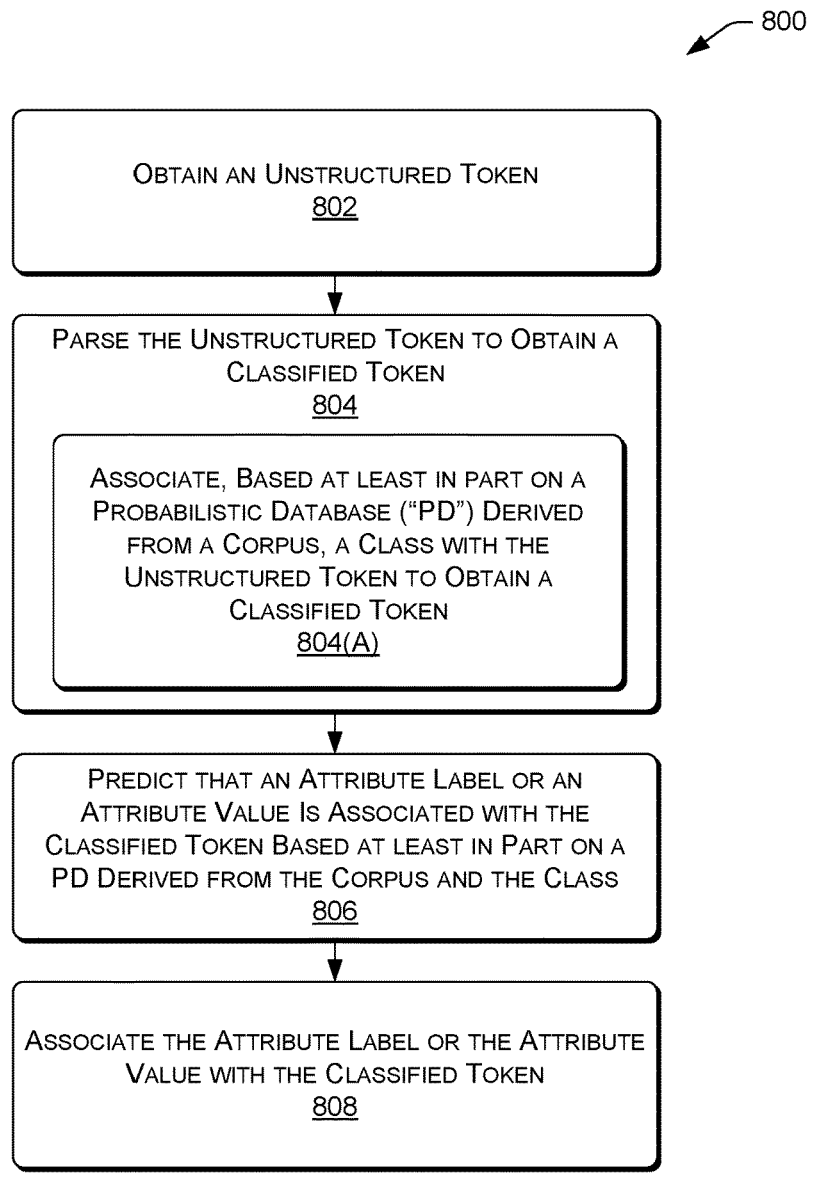
FIG. 8 is a flow diagram illustrating an example process to obtain a classified token from an unstructured token and to predict an attribute label and/or an attribute value for the classified token.
Figure 9:
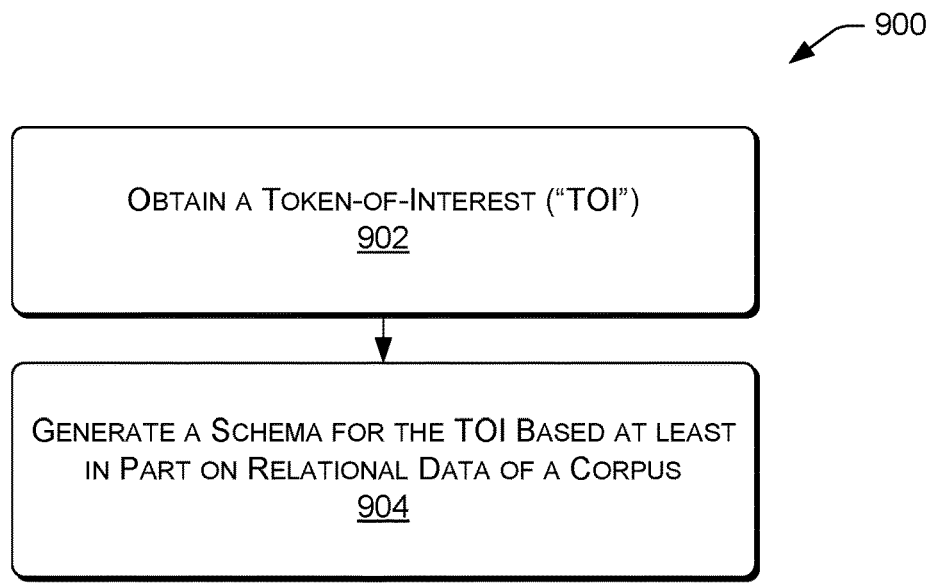
FIG. 9 is a flow diagram illustrating an example process to generate a schema for a token-of-interest ("TOI").
Figure 10:
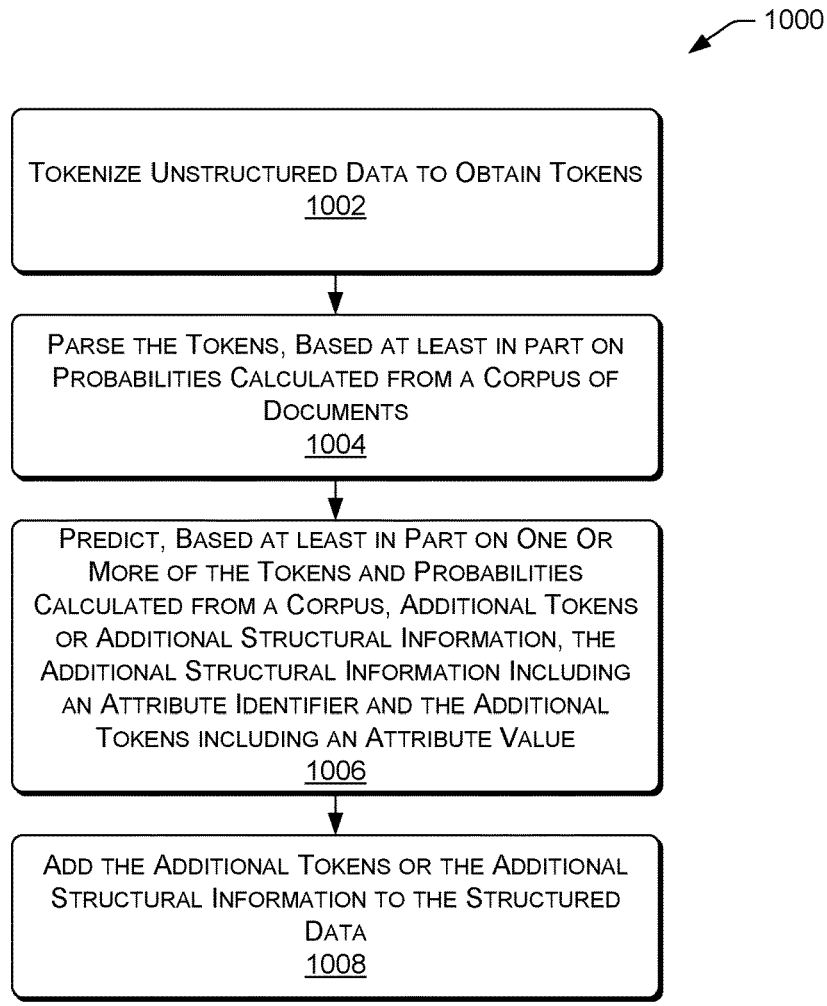
FIG. 10 is a flow diagram illustrating an example process to obtain structural information from an unstructured token based on parsing and/or predicting that leverages corporal data.

FIG. 8-FIG. 10 illustrate example processes 800, 900, and 1000, which can be performed in whole or in part. These processes can, but need not be, performed using the example device 300 of FIG. 3.

FIG. 8 depicts an example process 800 of parsing an unstructured token to obtain a classified token from an unstructured token and predict an attribute label or an attribute value for the classified token.

At 802, the PPF 312 can obtain an unstructured token. In some examples, the PPF 312 retrieves the unstructured token from a memory (whether locally or remotely), receiving the unstructured token (e.g., provision of the unstructured token to the PPF 312 by the operating system 308), and/or by capturing the unstructured token, etc.

At 804, the PPF 312 can parse the unstructured token according to any of the techniques discussed herein. In some examples, the PPF 312 parses the unstructured token based at least in part on a probabilistic database derived from a corpus, a class with the unstructured token to obtain a classified token.

At 806, the PPF 312 predicts that an attribute label or an attribute value is associated with the classified token based at least in part on a probabilistic database derived from the corpus and the class according to any of the techniques discussed herein.

At 808, the PPF 312 associates the attribute label or the attribute value with the classified token according to any of the techniques discussed herein.

FIG. 9 depicts an example process 900 to generate a schema for a TOI.

At 902, the PPF 312 can obtain a TOI according to any of the techniques discussed herein. In some examples, the PPF 312 can use a tokenizer to break up obtained unstructured data. In some examples, the PPF 312 can also perform data cleaning and other fuzzy matching techniques on the tokens to obtain the TOI.

At 904, the PPF 312 can generate a schema for the TOI based at least in part on relational data of a corpus according to any technique discussed herein. In some examples, the schema is a defined relational structure. In some examples, the schema can include a relation between the TOI and a parsed label that classifies the TOI, a relation between the parsed label and a predicted label or between the TOI and the predicted label, and/or a relation between the predicted label and a predicted token (e.g., a class value, or, as in relation to the TOI, an attribute value), the predicted label classifying the predicted token and the predicted token including latent data associated with the TOI.

FIG. 10 depicts an example process 1000 to obtain structural information from unstructured token based on parsing and predicting that uses corporal data.

At 1002, the PPF 312 can tokenize unstructured data to obtain tokens according to any of the techniques discussed herein. In some examples, this can further include data cleaning and other fuzzy matching techniques.

At 1004, the PPF 312 can parse the tokens, based at least in part on probabilities calculated from a corpus, to form structured data according to any of the techniques discussed herein.

At 1006, the PPF 312 can predict additional tokens or additional structural information according to any of the techniques discussed herein. In some examples, the PPF 312 can predict additional tokens or additional structural information based at least in part on one or more of the obtained tokens and probabilities calculated from a corpus. In some examples, the probabilities include one or more of a support metric, a confidence metric, or weights or normalization derived therefrom. In some examples, the additional structural information can include an attribute identifier and the additional tokens can include an attribute value.

At 1008, the PPF 312 can add the additional tokens or the additional structural information to the structured data according to any of the techniques discussed herein.

Example Clauses

A. A method comprising: obtaining an unstructured token, the unstructured token being unassociated with a class identifier, attribute identifier, or attribute value; parsing the unstructured token, the parsing including associating, based at least in part on a probabilistic database derived from a corpus, a class identifier with the unstructured token to obtain a classified token; predicting that an attribute label or an attribute value is associated with the classified token based at least in part on another probabilistic database derived from the corpus and the class identifier; and associating the attribute label or the attribute value with the classified token.

B. A method as paragraph A recites, further comprising iteratively predicting an additional attribute label or an additional attribute value based at least in part on a previously predicted attribute label, a previously predicted attribute value, or a previously parsed classification.

C. A method as either paragraph A or B recites, the parsing the unstructured token further including identifying one or more of a semantic class, syntactic class, or a syntactic function of the unstructured token.

D. A method as any one of paragraphs A-C recites, the associating the class identifier with the undefined token to obtain the classified token being further based at least in part on the syntactic class or the syntactic function of the unstructured token.

E. A method as any one of paragraphs A-D recites, wherein the unstructured token is one token of a set of tokens and the associating the class identifier with the unstructured token to obtain the classified token is further based at least in part on an arrangement of individual tokens of the set of tokens relative to other individual tokens of the set of tokens.

F. A method as any one of paragraphs A-E recites, further comprising calculating a second probabilistic database from the corpus for the unstructured token or the classified token ("the token-of-interest ("TOI")"), the calculating including: identifying class identifiers, class values, attribute labels, or attribute values associated with the TOI, the identified class identifiers, class values, attribute labels, or attribute values being "candidate classifications"; and calculating a frequency with which the TOI is associated with the candidate classifications, the frequency being associated with a probability that the candidate classifications is associated with token.

G. A method as any one of paragraphs A-F recites, wherein the associating the class identifier with the unstructured token or associating the attribute label or the attribute value with the classified token includes: ranking the candidate classifications according to highest probability of being associated with the token; and assigning a top-k number of the candidate classifications to the token, where k is an integer value greater than or equal to A.

H. A method as any one of paragraphs A-G recites, the parsing including: calculating, from the corpus, the another probabilistic database based at least in part on the unstructured token, the another probabilistic database including: candidate classifications, the candidate classifications including the class identifier; and probabilities that the candidate classifications are associated with the unstructured token; and associating the class identifier with the unstructured token based at least in part on the probabilities.

I. A method as any one of paragraphs A-H recites, the predicting that an attribute label is associated with the classified token including: calculating, from the corpus, the another probabilistic database, the another probabilistic database including: candidate attribute labels; probabilities that the candidate attribute labels are associated with one or more of the class identifier, the unstructured token, or the unstructured token; associating one of the candidate attribute labels with the token based at least in part on the probabilities, the one of the candidate attribute labels being a latent attribute label.

J. A method as any one of paragraphs A-I recites, the predicting that an attribute value is associated with the classified token including: calculating, from the corpus, a third probabilistic database, the third probabilistic database including: candidate attribute values; second probabilities that the candidate attribute values are associated with one or more of the latent attribute label, the class identifier, the unstructured token, or the classified token; and associating one of the candidate attribute values with the latent attribute label or the defined token based at least in part on the second probabilities.

K. A method as any one of paragraphs A-J recites, wherein one or more of the class identifier, the attribute label, or the attribute value include a token of the corpus.

L. A system comprising: one or more processors; computer-readable media having stored thereon computer-executable instructions that, when executed by the one or more processors, configure the system to perform operations comprising: obtaining a token-of-interest ("TOI"); generating a schema for the TOI based at least in part on relational data of a corpus, the schema including: a first relation between the TOI and a parsed label classifying the TOI, a second relation between the parsed label and a predicted label, and a third relation between the predicted label and a predicted token, the predicted label classifying the predicted token and the predicted token including latent data associated with the TOI, M. A system as paragraph L recites, the generating including: identifying the corpus, the corpus containing one or more of the TOI, the parsed label, the predicted label, or the predicted token; and selecting the parsed label, the predicted label, or the predicted token from among tokens of the corpus, the selecting based at least in part on the relational data of the corpus and the relational data being based at least in part on: a frequency with which the parsed label is associated with the TOI in the corpus, a frequency with which the predicted label is associated with the TOI or the parsed label in the corpus, or a frequency with which the predicted token is associated with the predicted label or the TOI in the corpus.

N. A system as either paragraph L or M recites, the parsed label, the predicted label, or the predicted token being in a top-k number of tokens ranked by frequency, wherein k is an integer value greater than or equal to A.

O. A system as any one of paragraphs L-N recites, the relational data further including: distribution data of frequencies with which tokens of the corpus are associated with the parsed label, the predicted label, or the predicted token; contextual data, the contextual data including one or more of: tokens associated with the TOI, labels associated with the tokens associated with the TOI, or an arrangement of the TOI relative to the tokens associated with the TOI.

P. A system as any one of paragraphs L-O recites, the generating including: selecting, from tokens of a corpus of documents containing the TOI, the parsed label based at least in part on a frequency with which the parsed label is related to the TOI in the corpus of documents containing the TOI; selecting, from tokens of one or more of the corpus of documents containing the TOI or from a corpus of documents containing the parsed label, the predicted label based at least in part on a frequency with which the predicted label is associated with the parsed label in one or more of the corpus of documents containing the TOI or the corpus of documents containing the parsed label; and selecting, from tokens of a corpus of documents containing the predicted label, the predicted token based at least in part on a frequency with which the predicted token is related to the predicted label in the corpus of documents containing the second label.

Q. A method comprising: tokenizing unstructured data to obtain tokens, the unstructured data lacking relational structure the unstructured data and identifiers of what the data is or what the data is like; parsing the tokens, based at least in part on probabilities calculated from a corpus, to form structured data; predicting, based at least in part on one or more of the tokens and probabilities calculated from a corpus, additional tokens or additional structural information, the additional structural information including an attribute identifier and the additional tokens including an attribute value; and adding the additional tokens or the additional structural information to the structured data.

R. A method as paragraph Q recites, the parsing being further based, at least in part, on one or more of: an arrangement of the tokens relative to each other; a parsing of one of the tokens; a predicted additional token or predicted structural information; or tail data of probabilities calculated from a corpus.

S. A method as either paragraph Q or R recites, further comprising: receiving a target attribute identifier; performing one or more predictions of attribute identifiers until the target attribute identifier is predicted, the one or more predictions being based at least in part on one or more of the tokens, the structured data, one or more of previously predicted attribute identifiers, or probabilities calculated from a corpus; and predicting an attribute value for the target attribute identifier based at least in part on one or more of the tokens or the one or more predicted attribute identifiers.

T. A method as any one of paragraphs Q-S recites, the corpus including structured information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or operations. Thus, such conditional language is not generally intended to imply that certain features, elements and/or operations are in any way required for one or more examples or that one or more examples necessarily include logic for deciding, with or without user input or prompting, whether certain features, elements and/or operations are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   obtaining an unstructured token, the unstructured token being unassociated with a class identifier, attribute identifier, or attribute value;
   parsing the unstructured token, the parsing including associating, based at least in part on a probabilistic database derived from a corpus, a class identifier with the unstructured token to obtain a classified token;
   predicting that an attribute label or an attribute value is associated with the classified token based at least in part on another probabilistic database derived from the corpus and the class identifier; and
   associating the attribute label or the attribute value with the classified token.

2. A method as claim 1 recites, further comprising iteratively predicting an additional attribute label or an additional attribute value based at least in part on a previously predicted attribute label, a previously predicted attribute value, or a previously parsed classification.

3. A method as claim 1 recites, the parsing the unstructured token further including identifying one or more of a semantic class, syntactic class, or a syntactic function of the unstructured token.

4. A method as claim 3 recites, the associating the class identifier with the undefined token to obtain the classified token being further based at least in part on the syntactic class or the syntactic function of the unstructured token.

5. A method as claim 1 recites, wherein the unstructured token is one token of a set of tokens and the associating the class identifier with the unstructured token to obtain the classified token is further based at least in part on an arrangement of individual tokens of the set of tokens relative to other individual tokens of the set of tokens.

6. A method as claim 1 recites, further comprising calculating a second probabilistic database from the corpus for the unstructured token or the classified token ("the token-of-interest ("TOI")"), the calculating including:
   identifying class identifiers, class values, attribute labels, or attribute values associated with the TOI, the identified class identifiers, class values, attribute labels, or attribute values being "candidate classifications"; and
   calculating a frequency with which the TOI is associated with the candidate classifications, the frequency being associated with a probability that the candidate classifications is associated with token.

7. A method as claim 1 recites, wherein the associating the class identifier with the unstructured token or associating the attribute label or the attribute value with the classified token includes:
   ranking the candidate classifications according to highest probability of being associated with the token; and
   assigning a top-k number of the candidate classifications to the token, where k is an integer value greater than or equal to 1.

8. A method as claim 1 recites, the parsing including:
   calculating, from the corpus, the another probabilistic database based at least in part on the unstructured token, the another probabilistic database including:
      candidate classifications, the candidate classifications including the class identifier; and
      probabilities that the candidate classifications are associated with the unstructured token; and
   associating the class identifier with the unstructured token based at least in part on the probabilities.

9. A method as claim 1 recites, the predicting that an attribute label is associated with the classified token including:
   calculating, from the corpus, the another probabilistic database, the another probabilistic database including:
      candidate attribute labels;
      probabilities that the candidate attribute labels are associated with one or more of the class identifier, the unstructured token, or the unstructured token;
   associating one of the candidate attribute labels with the token based at least in part on the probabilities, the one of the candidate attribute labels being a latent attribute label.

10. A method as claim 9 recites, the predicting that an attribute value is associated with the classified token including:
   calculating, from the corpus, a third probabilistic database, the third probabilistic database including:

candidate attribute values;
second probabilities that the candidate attribute values are associated with one or more of the latent attribute label, the class identifier, the unstructured token, or the classified token; and
associating one of the candidate attribute values with the latent attribute label or the defined token based at least in part on the second probabilities.

11. A method as claim 1 recites, wherein one or more of the class identifier, the attribute label, or the attribute value include a token of the corpus.

12. A system comprising:
one or more processors;
computer-readable media having stored thereon computer-executable instructions that, when executed by the one or more processors, configure the system to perform operations comprising:
obtaining a token-of-interest ("TOI");
generating a schema for the TOI based at least in part on relational data of a corpus, the schema including:
a first relation between the TOI and a parsed label classifying the TOI,
a second relation between the parsed label and a predicted label, and
a third relation between the predicted label and a predicted token, the predicted label classifying the predicted token and the predicted token including latent data associated with the TOI.

13. A system as claim 12 recites, the generating including:
identifying the corpus, the corpus containing one or more of the TOI, the parsed label, the predicted label, or the predicted token; and
selecting the parsed label, the predicted label, or the predicted token from among tokens of the corpus, the selecting based at least in part on the relational data of the corpus and the relational data being based at least in part on:
a frequency with which the parsed label is associated with the TOI in the corpus,
a frequency with which the predicted label is associated with the TOI or the parsed label in the corpus, or
a frequency with which the predicted token is associated with the predicted label or the TOI in the corpus.

14. A system as claim 13 recites, the parsed label, the predicted label, or the predicted token being in a top-k number of tokens ranked by frequency, wherein k is an integer value greater than or equal to 1.

15. A system as claim 13 recites, the relational data further including:
distribution data of frequencies with which tokens of the corpus are associated with the parsed label, the predicted label, or the predicted token;
contextual data, the contextual data including one or more of:
tokens associated with the TOI,
labels associated with the tokens associated with the TOI, or
an arrangement of the TOI relative to the tokens associated with the TOI.

16. A system as claim 12 recites, the generating including:
selecting, from tokens of a corpus of documents containing the TOI, the parsed label based at least in part on a frequency with which the parsed label is related to the TOI in the corpus of documents containing the TOI;
selecting, from tokens of one or more of the corpus of documents containing the TOI or from a corpus of documents containing the parsed label, the predicted label based at least in part on a frequency with which the predicted label is associated with the parsed label in one or more of the corpus of documents containing the TOI or the corpus of documents containing the parsed label; and
selecting, from tokens of a corpus of documents containing the predicted label, the predicted token based at least in part on a frequency with which the predicted token is related to the predicted label in the corpus of documents containing the second label.

17. A method comprising:
tokenizing unstructured data to obtain tokens, the unstructured data lacking relational structure the unstructured data and identifiers of what the data is or what the data is like;
parsing the tokens, based at least in part on probabilities calculated from a corpus, to form structured data;
predicting, based at least in part on one or more of the tokens and probabilities calculated from a corpus, additional tokens or additional structural information, the additional structural information including an attribute identifier and the additional tokens including an attribute value; and
adding the additional tokens or the additional structural information to the structured data.

18. A method as claim 17 recites, the parsing being further based, at least in part, on one or more of:
an arrangement of the tokens relative to each other;
a parsing of one of the tokens;
a predicted additional token or predicted structural information; or
tail data of probabilities calculated from a corpus.

19. A method as claim 17 recites, further comprising:
receiving a target attribute identifier;
performing one or more predictions of attribute identifiers until the target attribute identifier is predicted, the one or more predictions being based at least in part on one or more of the tokens, the structured data, one or more of previously predicted attribute identifiers, or probabilities calculated from a corpus; and
predicting an attribute value for the target attribute identifier based at least in part on one or more of the tokens or the one or more predicted attribute identifiers.

20. A method as claim 17 recites, the corpus including structured information.

* * * * *